(12) United States Patent
Minamino et al.

(10) Patent No.: US 7,333,986 B2
(45) Date of Patent: *Feb. 19, 2008

(54) HIERARCHICAL DATABASE MANAGEMENT SYSTEM, HIERARCHICAL DATABASE MANAGEMENT METHOD, AND HIERARCHICAL DATABASE MANAGEMENT PROGRAM

(75) Inventors: Noriko Minamino, Tokyo (JP); Hiroshi Murayama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 388 days.

This patent is subject to a terminal disclaimer.

(21) Appl. No.: 11/086,229

(22) Filed: Mar. 23, 2005

(65) Prior Publication Data

US 2005/0234978 A1 Oct. 20, 2005

(30) Foreign Application Priority Data

Mar. 31, 2004 (JP) ............................. 2004-106158

(51) Int. Cl.
  *G06F 17/30* (2006.01)
(52) U.S. Cl. .......................................... 707/8; 707/201
(58) Field of Classification Search ................ 707/1–6, 707/9, 10, 100–103 R, 104.1, 200, 203; 715/514, 715/804, 853; 719/313, 315, 316
See application file for complete search history.

(56) References Cited

U.S. PATENT DOCUMENTS

| | | | | |
|---|---|---|---|---|
| 5,895,474 A | * | 4/1999 | Maarek et al. | ............... 715/514 |
| 5,953,724 A | * | 9/1999 | Lowry | ......................... 707/102 |
| 6,243,709 B1 | * | 6/2001 | Tung | ....................... 707/103 R |
| 6,374,256 B1 | * | 4/2002 | Ng et al. | ................ 707/103 R |
| 6,477,528 B1 | * | 11/2002 | Takayama | ....................... 707/5 |
| 6,629,094 B1 | * | 9/2003 | Colby et al. | .................... 707/4 |
| 6,633,788 B1 | * | 10/2003 | Riley et al. | .................... 700/97 |
| 2004/0107209 A1 | | 6/2004 | Minamino et al. | |
| 2004/0162838 A1 | | 8/2004 | Murayama et al. | |
| 2005/0027724 A1 | | 2/2005 | Minamino et al. | |

FOREIGN PATENT DOCUMENTS

| | | |
|---|---|---|
| EP | 1 102 188 A2 | 5/2001 |
| JP | 2001-147920 | 5/2001 |
| JP | 2004-177996 | 6/2004 |

OTHER PUBLICATIONS

Kim, Won, "Object-oriented Concepts, Database, and Applications," 1989, pp. 1-3, 6-10, ACM Press, New York, USA.

* cited by examiner

*Primary Examiner*—Jeffrey Gaffin
*Assistant Examiner*—Jacques Veillard
(74) *Attorney, Agent, or Firm*—Finnegan, Henderson, Farabow, Garrett & Dunner, L.L.P.

(57) ABSTRACT

A hierarchical database, in which a lower class inherits to a property of an super class, having a class code for each class to identify the class, includes a first classification system having a regular class, and a second classification system having the regular class and a synonymous class referring to and using the regular class of the first classification system, wherein the synonymous class has an identification information to identify it is the synonymous class, a class code of the synonymous class, and a class code of the regular class of the first classification system to which the synonymous class refers.

18 Claims, 33 Drawing Sheets

| Class | Relationship | Related class |
|---|---|---|
| Z03 T company personal computer | Synonymous class | T04 Personal computer |
| Z04 X company personal computer | Synonymous class | X03 Company PC |
| Z03 T company personal computer | sub - class | Z02 Personal computer purchasing department |
| Z04 X company personal computer | sub - class | Z02 Personal computer purchasing department |
| Z02 Personal computer purchasing department | sub - class | Z01 Purchasing department |
| Z01 Purchasing department | sub - class | UNIVERSAL_ROOT |

91 — 33 — Display source class in synonymous class

-Universal Root
 -Z01 Purchasing department
  -Z02 Personal computer purchasing department
   -Z03 T company personal computer  (SYN)
    -T04 Personal computer
   -Z04 X company personal computer  (SYN)
    -X03 Company PC
 -T01 T company product root
  -T02 Office / domestic article
   -T03 Digital product
    +T04 Personal computer

FIG. 9

96 — 34 — Display synonymous class in source class

-T01 T company product root
 -T02 Office / domestic article
  -T03 Digital product
   -T04 Personal computer
    T05 Desktop PC
    +T06 Notebook PC
    Z03 T company personal computer (SYN)

FIG. 10

```
ISO-10303-21;
HEADER;
FILE_DESCRIPTION(('test'),'2;1');
FILE_NAME('Z-Company-Koubaibumon.spf','2003-03-24 23:39:19',('Noriko Minamino'),('TOKYO'),
','',');
FILE_SCHEMA(('ISO13584_G_M_IIM_LIBRARY_IMPLICIT_SCHEMA'));
ENDSEC;

DATA;
#1006=LIBRARY(#1038,#1005,(),(),(#4861),(#1033,#1026,#4776,#1019,#4226,#1012),(),#1004,$,$,());
    ··
    Omitted
    ··
```

F I G. 12

```
..
Omitted
..

#1038=SUPPLIER_BSU('140'/Z-Company/'','*');
#1039=SUPPLIER_ELEMENT(#1038,#1037,'001',#1036,#1035);
#1036=ORGANIZATION('sss','sss','sss');
#1035=ADDRESS($,$,$,$,$,$,$,$,$,$,$,$,$);
#4861=SUPPLIER_BSU('140'/T-Company/'','*');
#4862=SUPPLIER_BSU('140'/X-Company/'','*');
#4776=CLASS_BSU('T04','001',#4861);
#4226=CLASS_BSU('X03','001',#4862);
#1026=CLASS_BSU('Z02','001',#1038);
#1027=ITEM_CLASS(#1026,#1037,'001',#1025,TEXT(''),$,$,$,#1033,(),(),$,(),$);
#1025=ITEM_NAMES(LABEL('Personal computer purchasing department'),(),LABEL(''),$,$;
#1019=CLASS_BSU('Z03','001',#1038);
#1020=COMPONENT_CLASS_CASE_OF(#1019,#1037,'001',#1018,TEXT(''),(),$,$,
TEXT('$SYNONYM'),#1026,(),(),$,(),$,*,*,*,*,*,(#4776),(),(),(),();
#1018=ITEM_NAMES(LABEL('T company personal computer'),(),LABEL(''),$,$);
#1012=CLASS_BSU('Z04','001',#1038);
#1013=COMPONENT_CLASS_CASE_OF(#1012,#1037,'001',#1011,TEXT(''),$,$,
TEXT('$SYNONYM'),#1026,(),(),$,(),$,*,*,*,*,*,(#4226),(),(),(),();
#1011=ITEM_NAMES(LABEL('X company personal computer'),(),LABEL(''),$,$);

ENDSEC;
END-ISO-10303-21;
```

131, 132, 133

F I G. 13

```
..
Omitted
..

#1038=SUPPLIER_BSU('140/Z-Company//',*);
#1039=SUPPLIER_ELEMENT(#1038,#1037,'001',#1036,#1035);
#1036=ORGANIZATION('sss','sss','sss');
#1035=ADDRESS($,$,$,$,$,$,$,$,$,$,$);
#1026=CLASS_BSU('Z02','001',#1038);
     ⎧ #1027=ITEM_CLASS(#1026,#1037,'001',#1025,TEXT(''),$,$,$,#1033,(),(),$,(),(),$);
141 ⎨ #1025=ITEM_NAMES(LABEL('Personal computer purchasing department'),(),LABEL(''),$,$);
     ⎩ #1019=CLASS_BSU('Z03','001',#1038);
     ⎧ #1020=COMPONENT_CLASS(#1019,#1037,'001',#1018,TEXT(''),$,$,
142 ⎨ TEXT('$SYNONYM-140/T_Company//.T04-001'),#1026,(),(),$,(),(),$,*,*,*,*,*,*);
     ⎩ #1018=ITEM_NAMES(LABEL('T company personal computer'),(),LABEL(''),$,$);
     ⎧ #1012=CLASS_BSU('Z04','001',#1038);
143 ⎨ #1013=COMPONENT(#1012,#1037,'001',#1011,TEXT(''),$,$,
     ⎨ TEXT('$SYNONYM-140/T_Company//.X03-001'),#1026,(),(),$,(),(),$,*,*,*,*,*,*);
     ⎩ #1011=ITEM_NAMES(LABEL('X company personal computer'),(),LABEL(''),$,$);

ENDSEC;
END-ISO-10303-21;
```

FIG. 14

| Class type | Class BSU | Class name | Supper class | Reference target class |
|---|---|---|---|---|
| COMPONENT_CLASS | Z01 | Purchasing department | UNIVERSAL_ROOT | |
| COMPONENT_CLASS | Z02 | Personal computer purchasing department | Z01 | |
| SYNONYM_COMPONENT_CLASS | Z03 | T company personal computer | Z02 | 140/T_Company//.T04_001 |
| SYNONYM_COMPONENT_CLASS | Z04 | X company personal computer | Z02 | 140/T_Company//.X03_001 |
| ... | ... | ... | ... | ... |

F I G. 15

```
create class '140/TOPAS2//.Z03' of component_class(
        super_class 'Z02',
        preferred_name 'T company personal computer',
        remark '$SYNONYM-140/TOPAS1//.T04',
)
```

FIG. 16

```
create class '140/TOPAS2//.Z03' of component_case_of_class(
        super_class 'Z02',
        preferred_name 'T company personal computer',
        remark '$SYNONYM',
        is_case_of '140/TOPAS2//.T04'
)
```

FIG. 17

```
ENTITY SYNONYMOUS_ITEM_CLASS
SUBTYPE OF (ITEM_CLASS_CASE_OF);
END_ENTITY;

ENTITY SYNONYMOUS_COMPONENT_CLASS
SUBTYPE OF (COMPONENT_CLASS_CASE_OF);
END_ENTITY;

ENTITY SYNONYMOUS_MATERIAL_CLASS
SUBTYPE OF (MATERIAL_CLASS_CASE_OF);
END_ENTITY;

ENTITY SYNONYMOUS_FEATURE_CLASS
SUBTYPE OF (FEATURE_CLASS_CASE_OF);
END_ENTITY;
```

FIG. 18

```
    ..
    Omitted
    ..
    #1038=SUPPLIER_BSU('140/Z-Company/l',*);
    #1039=SUPPLIER_ELEMENT(#1038,#1037,'001',#1036,#1035);
    #1036=ORGANIZATION('sss','sss','sss');
    #1035=ADDRESS($,$,$,$,$,$,$,$,$,$,$,$);
    #1026=CLASS_BSU('Z02','001',#1038);
201 ⎰ #1027=ITEM_CLASS(#1026,#1037,'001',#1025,TEXT(''),$,$,$,#1033,(),(),$,(),(),$);
    ⎱ #1025=ITEM_NAMES(LABEL('Personal computer purchasing department'),(),LABEL(''),$,$);
    #1019=CLASS_BSU('Z03','001',#1038);
202 ⎰ #1020=SYNONYM_COMPONENT_CLASS(#1019,#1037,'001',#1018,TEXT(''),$,$,$,#1026,(),(),$,(),
    ⎱ (),$,*,*,*,*,(#4776),(),(),(),(),();
      #1018=ITEM_NAMES(LABEL('T company personal computer'),(),LABEL(''),$,$);
      #1012=CLASS_BSU('Z04','001',#1038);
203 ⎰ #1013=SYNONYM_COMPONENT_CLASS(#1012,#1037,'001',#1011,TEXT(''),$,$,$,#1026,(),(),$,(),
    ⎱ (),$,*,*,*,*,(#4226),(),(),(),(),();
      #1011=ITEM_NAMES(LABEL('X company personal computer'),(),LABEL(''),$,$);
    #4861=SUPPLIER_BSU('140/T-Company/l',*);          ⎱ Definition information of reference target class (T04) of class [Z03]
    #4776=CLASS_BSU('T04',001,#4861);                 ⎰
    #4862=SUPPLIER_BSU('140/X-Company/l',*);          ⎱ Definition information of reference target class (X03) of class [Z04]
    #4226=CLASS_BSU('X03',001,#4862);                 ⎰

ENDSEC;
    END-ISO-10303-21;
```

FIG. 20

```
..
Omitted
..

#1038=SUPPLIER_BSU('140/Z-Company/',' *');
#1039=SUPPLIER_ELEMENT(#1038,#1037,'001',#1036,#1035);
#1036=ORGANIZATION('sss','sss','sss');
#1035=ADDRESS($,$,$,$,$,$,$,$,$,$,$,$,$);
#1026=CLASS_BSU('Z02','001',#1038);
⎧ #1027=ITEM_CLASS(#1026,#1037,'001',#1025,TEXT(''),$,$,$,#1033,(),(),$,(),(),$);
211⎨ #1025=ITEM_NAMES(LABEL('Personal computer purchasing department'),(),LABEL(''),$,$);
⎩ #1019=CLASS_BSU('Z03','001',#1038);
#1020=COMPONENT_CLASS(#1019,#1037,'001',#1018,TEXT(''),$,$,
⎧ TEXT(''),#1026,(),(),$,(),(),$,******,'','',',');
212⎨ #1018=ITEM_NAMES(LABEL('T company personal computer'),(),LABEL(''),$,$);
⎩ #1012=CLASS_BSU('Z04','001',#1038);
⎧ #1013=COMPONENT(#1012,#1037,'001',#1011,TEXT(''),$,$,
213⎨ TEXT(''),#1026,(),(),$,(),(),$,******,'','',',');
⎩ #1011=ITEM_NAMES(LABEL('X company personal computer'),(),LABEL(''),$,$);

ENDSEC;
END-ISO-10303-21;
```

F I G. 21

Set Synonymous Class

Class Z03: T company personal computer is synonym class of T04: personal computer
140/Z_Company//.Z03_001=synonym_class_of (140/T_Company//.T04_001)

Class Z04: X company personal computer is synonym class of company PC
140/Z_Company//.Z04_001=synonym_class_of (140/X_Company//.X03_001)

FIG. 22

```
..
Omitted
..

#1038=SUPPLIER_BSU('140/Z-Company/l',*');
#1039=SUPPLIER_ELEMENT(#1038,#1037,'001',#1036,#1035);
#1036=ORGANIZATION('sss','sss','sss');
#1035=ADDRESS($,$,$,$,$,$,$,$,$,$,$);
#4861=SUPPLIER_BSU('140/T-Company/l',*');
#4862=SUPPLIER_BSU('140/X-Company/l',*');
#4776=CLASS_BSU('T04','001',#4861);
#4226=CLASS_BSU('X03','001',#4862);
#1026=CLASS_BSU('Z02','001',#1038);
#1027=ITEM_CLASS(#1026,#1037,'001',#1025,TEXT(''),$,$,$,#1033,(),(),$,(),(),$);
#1025=ITEM_NAMES(LABEL('Personal computer purchasing department'),(),LABEL(''),$,$);
#1019=CLASS_BSU('Z03','001',#1038);
#1020=COMPONENT_CLASS_CASE_OF(#1019,#1037,'001',#1018,TEXT(''),$,$,
$,#1026,(),(),$,(),(),$,*,*,*,*,*,(#4776),(),(),(),();
#1018=ITEM_NAMES(LABEL('T company personal computer'),(),LABEL(''),$,$);
#1012=CLASS_BSU('Z04','001',#1038);
#1013=COMPONENT_CLASS_CASE_OF(#1012,#1037,'001',#1011,TEXT(''),$,$,
$,#1026,(),(),$,(),(),$,*,*,*,*,*,(#4226),(),(),(),();
#1011=ITEM_NAMES(LABEL('X company personal computer'),(),LABEL(''),$,$);

ENDSEC;
END-ISO-10303-21;
```

231 { (lines #1027, #1025)
232 { (lines #1020, #1018)
233 { (lines #1013, #1011)

FIG. 23

Set Synonymous Class

Class Z03: T company personal computer is synonym class
140/Z_Company//.Z03_001=synonym_class

Class Z04: X company personal computer is synonym class
140/Z_Company//.Z04_001=synonym_class

FIG. 24

Table01: Content table existing in T05

| ☆ PRP001 Product name | ☆ PRP002 Manufacturer name | ☆ PRP003 Product code | PRP008 Display |
|---|---|---|---|
| Equium 001 | T company | TEQ-001 | Separate |
| Equium 003 | T company | TEQ-003 | Attached |

```

# File for typical data output

PROJECT DEMO
  DEFAULT_TYPICAL_NAME TYP001
    TOPAS_Demo.140/TOPAS//.T05.PRP001  Value=%Equium &
    TOPAS_Demo.140/TOPAS//.T05.PRP006  Value>=300
    TOPAS_Demo.140/TOPAS//.T05.PRP007  30<=Value<=40
    TOPAS_Demo.140/TOPAS//.T05.PRP002
  END
  TYPICAL_NAME TYP002
    :
  END
END

```
PROJECT DEMO
  140.TOPAS1//.Z03.JA=PC
  140.TOPAS2//.T13.JA=Digital camera
END
```

HIERARCHICAL DATABASE MANAGEMENT SYSTEM, HIERARCHICAL DATABASE MANAGEMENT METHOD, AND HIERARCHICAL DATABASE MANAGEMENT PROGRAM

CROSS-REFERENCE TO RELATED APPLICATIONS

This application is based upon and claims the benefit of priority from prior Japanese Patent Application No. 2004-106158, filed Mar. 31, 2004, the entire contents of which are incorporated herein by reference.

BACKGROUND OF THE INVENTION

1. Field of the Invention

The present invention relates to a hierarchical database management system, a hierarchical database management method and a hierarchical database management program which manage a hierarchical database.

2. Description of the Related Art

In versatile operating systems (OSs) such as an Microsoft Windows (™), UNIX (™) or LINUX (™), a tree view has been adopted as a graphical user interface (GUI). A tree-like directory structure or file structure is visually presented to the user by the tree view so that the user can navigate to a specific directory or file.

In respective nodes in the tree view, however, there in no relationship such as an inheritance relationship or an inclusive or subset relationship between information included in a high-order node and information included in a low-order node. Nodes prefixed by a root node in the tree just indicate that holders for information such as files, i.e., containers, are connected with each other in a tree form. This kind of structure is referred to as "hierarchical directory structure" in the description of this specification, and it is differentiated from a hierarchical database in this specification. In the present invention, a unit of information that characterizes a class and is associated with the class is referred to as a "property", and each information field or element that constitutes the information structure of the class or property is referred to as an "attribute".

On the other hand, a database as typified by an object-oriented database (OODB) or an object-relational database (ORDB) has a hierarchical structure in which a sub-class inherits to a property of a super class. In this database, the property increases progressively in the sub-class in accordance with inheritance. Here, the "inheritance" means the transmission of the properties of super class into its sub-class(es). Such a technique is described in, e.g., "Object-oriented Concepts, Database, and Applications", edited by Won Kim, 1989, ACM Press and many other references. Further, in the object-oriented database, a classification in a hierarchy is often called "class". On the other hand, in the object-relational database (ORDB), a table which has allowed inheritance corresponds to the inheritance, and a lower-order table inherits to a property from a high-order table between tables having hyponymy. That is, a lower-order table inherits header information of a column constituting a high-order table. In this specification, OODB and ORDB collectively mean "hierarchical database". Data having the same property type belonging to the classification of respective hierarchies is referred to as an "instance", and a set of such data is referred to as "population". A population of data is stored in a structure which is usually referred to as a table in a relational database (RDB) or ORDB. In a table, a line of properties constituting the table is called a header of the table.

A hierarchical database having a hierarchical structure as typified by an object-oriented database in which a sub-class inherits a property of a super class has a structure in which the property increases progressively in the sub-class in accordance with inheritance. Therefore, in case of setting an import of a specific property from a class in one dictionary 1 to a class in an other dictionary 2 or a multiple inheritance of all properties, a sub-class in a classification system of dictionary 2 inherits an imported class property of dictionary 1. In this case, generally, a sub-class which is equal to or inferior to the above-described class in the classification system in dictionary 2 is affected by revision of a definition of the corresponding property in dictionary 1. Furthermore, when complying with ISO 13584 Parts Library standards Part 24 (standards—volume No. 24), in character string type properties having language dependent values, identity between properties whose values can be written in multiple languages is essentially determined by codes which do not have linguistic meanings. Therefore, when, e.g., classes are implemented as tables in a database in accordance with the ISO 13584 standards, whether two classes are the same type must be judged by using codes in headers of the tables (alignments of properties) which are not dependent on the usual linguistic semantic interpretation (rather than codes in which character strings have regular linguistic meanings as typified by, e.g., "Product name").

When classes having the same concept exist in two standard classification dictionaries, it is normal in a conventional example that one dictionary issues codes irrespective of the other dictionary, and a GUI symbol as a class reference to another class in another dictionary is provided in a database storing both dictionaries so that reference from one dictionary class to the other dictionary class is indicated. As many GUI symbols, the same icons as folders or directories are used. Problems of this example are as follows.

(i) First, when these dictionaries are treated as a simple link which does not have a property inheritance relationship at all, the revision of the property definition can be independently carried out between one dictionary and another. If this revision of the definition is allowed, types and definition contents of properties of classes in both dictionaries become far different with time. As described above, it is hard to stably share the same concept between two classes in the two standard classification dictionaries. Moreover, when class names are given in multiple languages in one dictionary, reference to another class in another dictionary which also uses the same or different set of languages cannot be realized with a simple link mechanism which directly links a class name in one language to another class name in another language, unless a special function to search for a translated name related to the linked class corresponding to the language of the referencing class, or a translation mechanism from the language of the linked class to the language of the referencing class is provided.

On the other hand, when this reference relationship is treated as an inheritance relationship, there is the following problem.

(ii) A class in one dictionary inherits properties of a class in the other dictionary. As a result, the similarity of the classes in both dictionaries is maintained, but one dictionary is affected by the revision of the property definition of the other dictionary. For example, when a property is added to a class in one dictionary, a structure of the database must be changed and the property must be added in a class of the other dictionary making reference to the former class. Of course, in this case, both classes, property identification codes and others must be matched with each other.

In a conventional hierarchical database management technique, when two standard classification dictionaries have classes having the same concept, it is normal to provide a GUI symbol as a class reference to anther class in another dictionary so that reference from one dictionary class to the other dictionary class is expressed.

However, in case of treating reference to classes as a simple link which does not have a property inheritance relationship at all, types or definition contents of properties of both classes become far different with time, and it is hard to stably share the same concept between the two classes in two classification dictionaries.

Additionally, when a reference relationship between two classes in two dictionaries is treated as an inheritance relationship, since a class in one dictionary inherits a property of a class in the other dictionary, the similarity of the classes in both dictionaries can be maintained. However, one dictionary is affected by the revision of the property definition of the other dictionary. In this case, dictionary revision work becomes complicated.

BRIEF SUMMARY OF THE INVENTION

It is an object of the present invention to provide a hierarchical database management system, a hierarchical database management method and a hierarchical database management program which facilitate management between classes in a hierarchical database.

According to an aspect of the present invention, there is provided a hierarchical database, in which a lower class inherits to a property of an upper class, having a class code for each class to identify the class, comprising: a first classification system having a regular class; and a second classification system having the regular class and a synonymous class referring to and using the regular class of the first classification system, wherein the synonymous class has an identification information to identify it is the synonymous class, a class code of the synonymous class, and a class code of the regular class of the first classification system to which the synonymous class refers.

The present invention is not restricted to the system, but it can be achieved as a management method or a program applied to this system.

BRIEF DESCRIPTION OF THE SEVERAL VIEWS OF THE DRAWING

FIG. 5 is a view showing an example of a storage format of types of classes stored in a dictionary information storage portion according to the first embodiment;

FIG. 9 is view showing a display example of a class tree display portion according to the second embodiment;

FIG. 10 is a view showing a display example of class tree display portion according to the second embodiment;

FIG. 12 is a view showing a description example of dictionary information according to the third embodiment;

FIG. 13 is a view selectively showing a part in which class information in a Part21 file is written according to the third embodiment;

FIG. 14 is a view selectively showing a part in which class information in a Part21 file is written according to a fourth embodiment of the present invention;

FIG. 15 is a view showing a description example of synonymous classes according to a fifth embodiment of the present invention;

FIG. 16 is a view showing a description example of the synonymous class according to the fifth embodiment;

FIG. 17 is a view showing a description example of the synonymous class according to the fifth embodiment;

FIG. 18 is a view showing an example of a description of synonymous classes according to a sixth embodiment of the present invention;

FIG. 20 is a view showing an example where a Part21 file is written by using extension entities depicted in FIG. 19 according to the sixth embodiment;

FIG. 21 is a view illustrating a description of synonymous information according to a seventh embodiment according to the present invention;

FIG. 22 is a view illustrating description of the synonymous information according to the seventh embodiment;

FIG. 23 is a view illustrating a description of the synonymous information according to the seventh embodiment;

FIG. 24 is a view illustrating a description of the synonymous information according to the seventh embodiment;

FIG. 33 is a view showing an example of a setting file which is used to register a content table view according to the eleventh embodiment;

DETAILED DESCRIPTION OF THE INVENTION

Embodiments according to the present invention will now be described hereinafter.

FIRST EMBODIMENT

Figure 1:
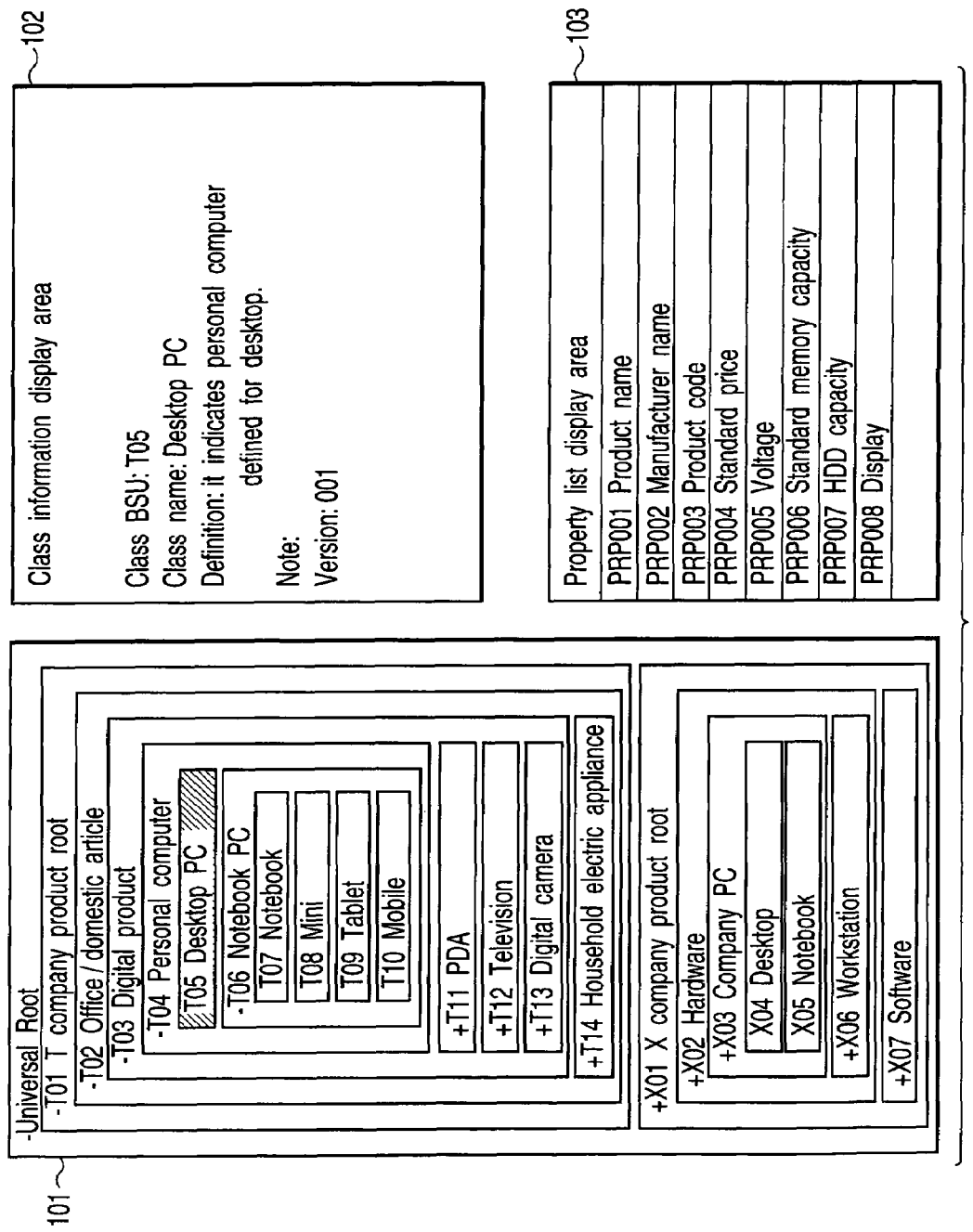
FIG. 1 is a view showing an example of a GUI used in a hierarchical database management system according to a first embodiment of the present invention.

FIG. 1 is a view showing an example of a GUI used in a hierarchical database management system according to a first embodiment of the present invention. FIG. 1 shows an example of a GUI which displays a hierarchical tree (a class tree), a classification (a class) and a property. When a class is selected from a class tree display portion 101, class information such as class code which identifies a class, a definition, a note, a version and others is displayed in a class information display portion 102. A property list display portion 103 displays a list of properties which can be used in that class.

Figure 2:
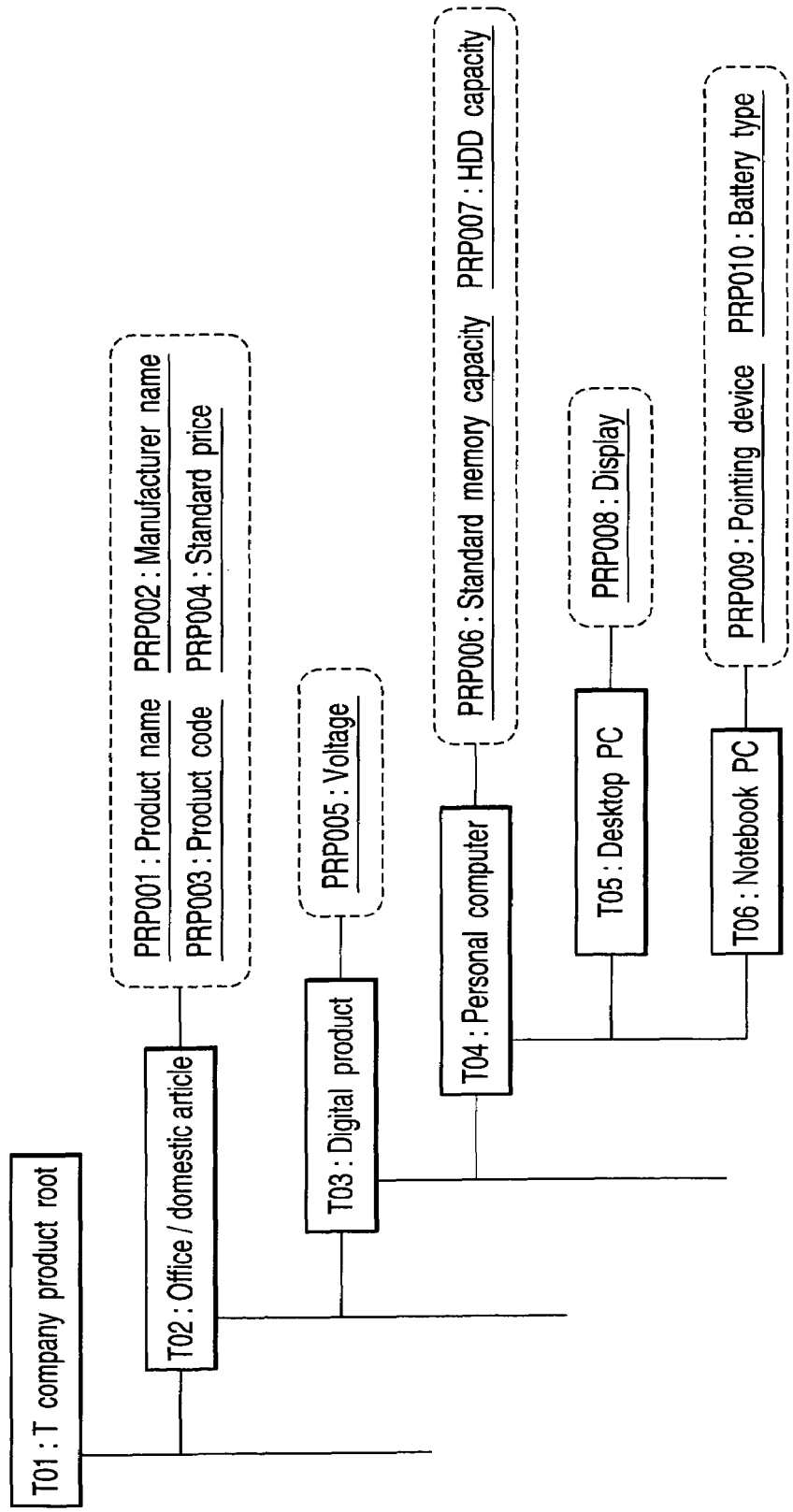
FIG. 2 is a conceptual view showing a hierarchical structure of classes and properties of each class according to the first embodiment.

FIG. 2 is a conceptual view showing hierarchical structure of classes and properties of each class. A sub-class inherits a property of a super class. Therefore, when each class has properties as shown in FIG. 2, for example, class "T05: Desktop PC" inherits the following properties:

(1) "PRP001: Product name", "PRP002: Manufacturer name", "PRP003: Product code" and "PRP004: Standard price" which are properties of class "T02: Office/domestic article";

(2) "PRP005: Voltage" of class "T03: Digital product"; and (3) "PRP006: Standard memory capacity" and "PRP007: HDD capacity" of class "T04: Personal computer".

In this manner, class "T05: Desktop PC" can utilize eight properties, i.e., the above-described seven properties as well as "PRP008: display" which is this class's own property.

Therefore, when class code "T05: Desktop PC" is selected in class tree display portion 101, class information of "T05: Desktop PC" is displayed in the class information display portion 102, and the eight properties are listed in the property list display portion 103.

Each class can have a content table which stores actual content data. A property set which is a schema of the content table is included in a set of properties which can be utilized in a class.

Figure 3:
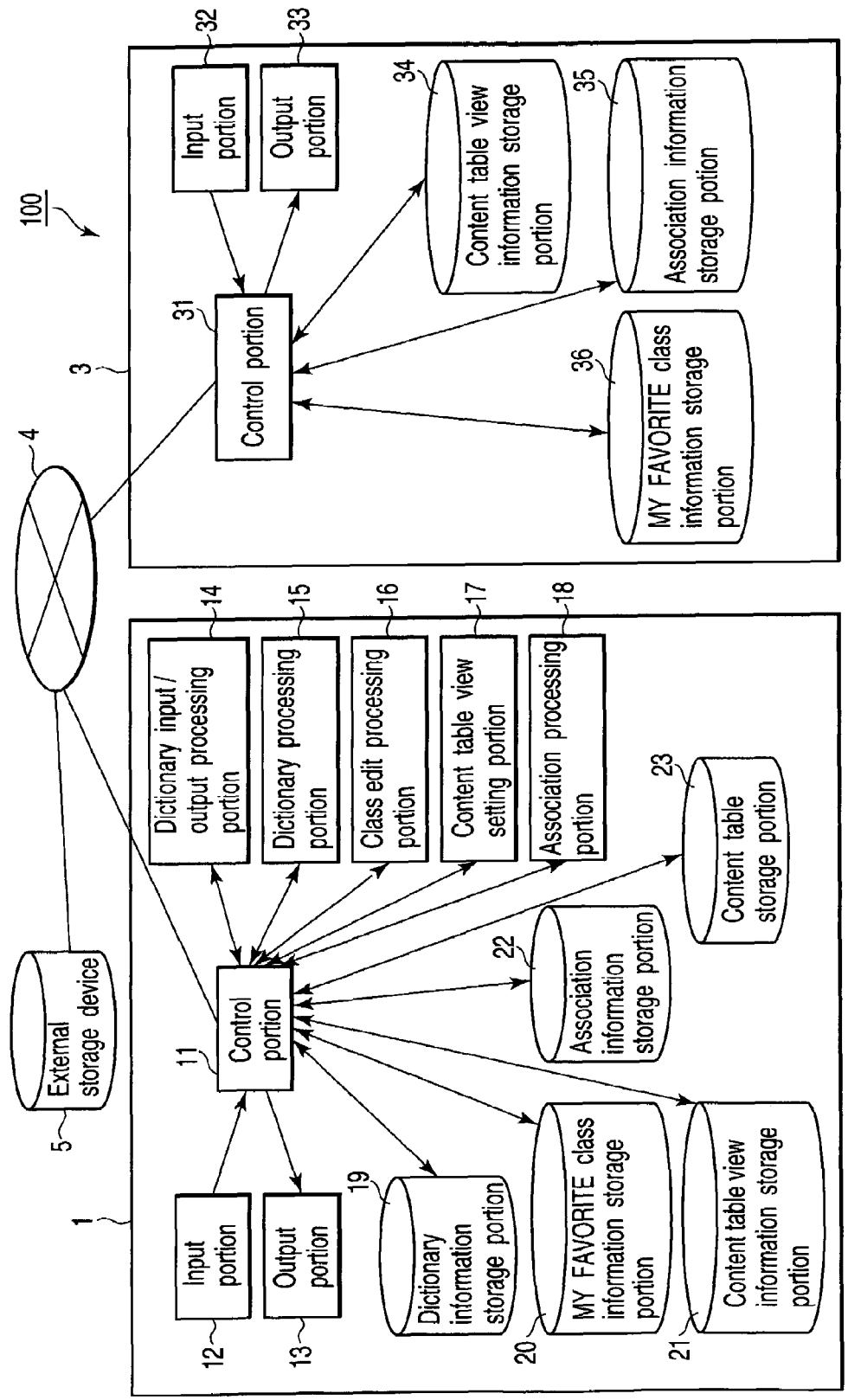
FIG. 3 is a view showing an example of a structure of the hierarchical database management system according to the first embodiment.

FIG. 3 is a view showing a structural example of a hierarchical database management system 100 according to the first embodiment. The hierarchical database management system 100 according to the first embodiment comprises a server 1, a client 3 and an external storage device 5. The server 1 stores, e.g., hierarchical information and instance data which are used to write product information, and presents such information to the user when requested. The client 3 requests product information for the server 1. The external storage device 5 stores dictionary information, various kinds of information or content information written in a file or the like.

The server 1, the client 3 and the external storage device 5 are connected with a network 4 so that they can transmit/receive information to/from each other.

Although the external storage device 5 is connected with the server 1 through the network 4 in FIG. 3, it may be provided in the server 1. An input portion 12 of the server 1 and an input portion 32 of the client 3 are input devices such as a keyboard or a mouse. An output portion 13 of the server 1 and an output portion 33 of the client 3 are display devices such as a CRT or a liquid crystal display.

A control portion 11 of the server 1 and a control portion 31 of the client 3 enable respective processing portions 14 to 18 to execute necessary processing in accordance with requests from the input portions 12 and 32, respectively. The respective processing portions 14 to 18 take out information required for processing from respective storage portions 19 to 23 or 34 to 36, or the external storage device 5, execute processing, and supply obtained results to the output portion 13 or 33 or store them in the external storage device 5.

A typical processing operation of the hierarchical database management system 100 will now be described. Upon receiving a processing request input from the input portion 32, the control portion 31 transmits a processing request to the server 1 through the network 4. The control portion 11 of the server 1 causes one of the processing portions 14 to 18 to execute necessary processing based on the received processing request. The processing portions 14 to 18 read necessary data from, e.g., one of the storage portions 19 to 23, or execute necessary processing based on data received from the client 3 or the external storage device 5 through the network 4. A processing result may be stored in one of the storage portions 19 to 23, transmitted to and stored in the external storage device 5 through the network 4, or transmitted to the client 3. A processing result transmitted to the client 3 is displayed in the output portion 33, or stored in one of the storage portions 34 to 36.

Figure 4:
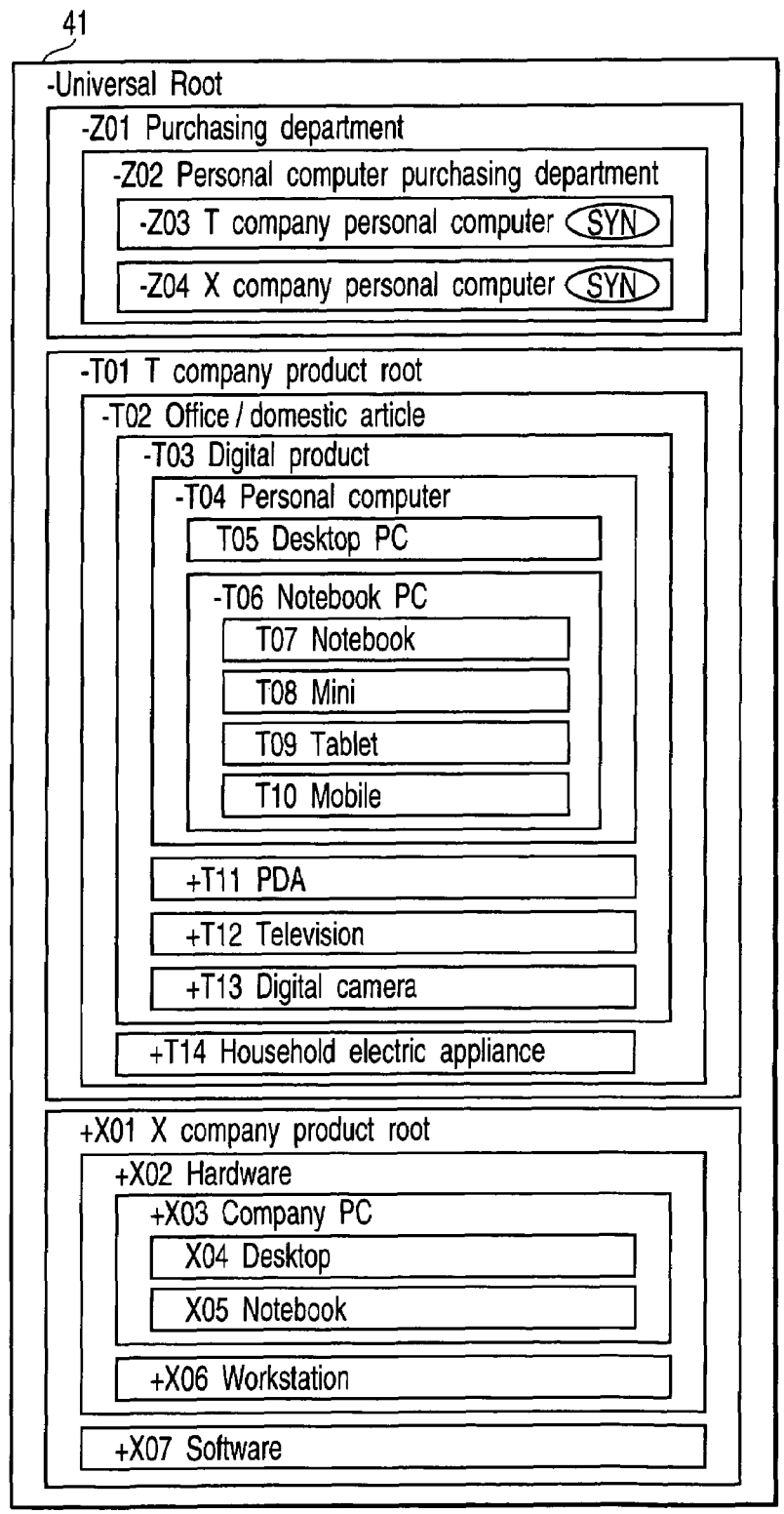
FIG. 4 is a view showing an example of display of a class tree presented to the user according to the first embodiment.

A dictionary processing portion 15 acquires dictionary information stored in a dictionary information storage portion 19. Then, the dictionary processing portion 15 forms a class tree based on this dictionary information, and presents it to the user. As to presentation to the user, data of class tree is transmitted to the control portion 31 of the client 3 from the control portion 11 of the server 1 through the network 4, for example. The control portion 31 displays the received data of class tree in the output portion 33. FIG. 4 is a view showing a display example of a class tree presented to the user. In a class tree display portion 41 depicted in FIG. 4, when a hierarchical classification (class) is selected by the user through the input portion 12 or the like, the dictionary processing portion 15 displays information of the class such as a definition or a note as the class information display portion 102 shown in FIG. 1 in accordance with a type of this class (a regular class, a synonymous class and others), and displays a list of properties which are defined in this class and inherited from a super class as the property list display portion 103 depicted in FIG. 1.

The type of class is stored in the dictionary information storage portion 19. FIG. 5 is a view showing an example of a storage format of types of classes stored in the dictionary information storage portion 19. As shown in FIG. 5, classes, related classes and relationships between classes and related classes are associated with each other and stored. In FIG. 5, each class or each related class comprises class code and the class name. For example, in regard to data of a dictionary information class at the top in FIG. 5, "Z03" is class code, and "T company personal computer" is the class name. The dictionary processing portion 15 forms a class tree based on this dictionary information.

A description will be given hereinafter while setting the example of FIG. 5 forth as a premise unless otherwise specified. In FIG. 5, a usual class (which will be referred to as "regular class" hereinafter) is designated as "sub-class" of a given class. For example, in the third dictionary information from the top in FIG. 5, class "Z03: T company personal computer" means a sub-class of class "Z02: Personal computer purchase category". Further, in the first dictionary information from the top in FIG. 5, class "Z03: T company personal computer" means a synonymous class of class "T04: Personal computer" which exists in another class tree. The "synonymous class" is a classification and an expression of a class which is commonly used for users who belong to a given community or organization, e.g., a product classification in a sales department (with respect to a product classification in a manufacture category). The synonymous class is a concept which is in contradistinction from the regular class. That is, a classification (class) which makes reference is the synonymous class, and a classification (class) which is referred to by the synonymous class is the regular class. A relationship with a related class functions as identification information which identifies the regular class and the synonymous class. Furthermore, as can be understood from FIG. 5, the synonymous class is written as an entity which is independent from the regular class.

The dictionary processing portion 15 displays class tree in which class "Z03" is a sub-class of class "Z02" and also displays symbol "SYN" which is indicative of a synonymous class in class tree based on synonym information indicative of a synonymous class, as shown in FIG. 4. As a result, a fact that class "Z03" is a synonymous class is explicitly presented to the user, the user can easily recognize that this is a class different from the regular class.

A dictionary input/output processing portion 14 reads a dictionary file having, e.g., Part21 format existing in the external storage device 5, interprets it, and stores it in the dictionary information storage portion 19. The format of the dictionary is usually Part21, but any other format may be used. When synonymous setting information or the like is written in another file, the above-described file is read together with or before/after this file, and stored in the dictionary information storage portion 19. The dictionary information stored in the dictionary information storage portion 19 is presented to the output portion 13 or 33 or output to the external storage device 5 in the form of, e.g., a file having Part21 format or any other format.

A class edit processing portion 16 edits the synonymous information separately input thereto by using the GUI, and stores it in the dictionary information storage portion 19.

A content table view setting processing portion 17 acquires a structure of each content table from a content table storage portion 23, and presents to the user a GUI which is used to set conditions for search or display of instance data. Further, the content table view setting processing portion 17 stores a content table in a content table view information storage portion 21 in accordance with input by the user. The content table view setting portion 17 reads conditions from a file stored in, e.g., the external storage device 5 rather than the GUI, and executes the same processing.

An association processing portion 18 presents to the user a GUI which is used to associate a class, each content table view information and a content table with each other, executes association in accordance with input from the user which is concretely input of an association command, and stores association information in an association information storage portion 32. The association processing portion 18 reads conditions from a file stored in, e.g., the external storage device 5 rather than the GUI, and executes the same processing.

A MY FAVORITES information storage portion 20 stores in accordance with the user or a group a MY FAVORITES class which is substantially the same as a synonymous class but can be defined in accordance with the user or a group. Since the MY FAVORITES class can be freely defined in accordance with the user or a group, it is not processed as dictionary information like the synonymous class.

The MY FAVORITES class can be set by using the GUI which is the same as that used in setting the synonymous class in the class edit processing portion 16. In this case, however, since the MY FAVORITES class is not treated as dictionary information as different from the synonymous class, it is stored in the MY FAVORITES information storage portion 20 rather than the dictionary information storage portion 19.

In the example shown in FIG. 3, although the dictionary processing portion 15, the class edit processing portion 16, the content table view setting processing portion 17 and the association processing portion 18 are constituent elements of the server 1, they may also access to a database existing in the server 1 and execute processing in the client 3 based on the obtained data as constituent elements of the client 3. In this case, all or any of the respective processing portions 15 to 18 are provided in the client 3.

FIG. 4 is a display example of a class tree used when a purchasing department of Z company purchases materials. Class trees of both the T company and the X company are shown. The purchasing department of the Z company selects a product classification (class) from the product class trees of the T company and the X company. There is a Personal computer purchasing department in the purchasing department of the T company. Since this Personal computer purchasing department does not perform purchasing acts other than Personal computer purchasing, it is troublesome for a person in charge in this Personal computer purchasing department to trace class tree and display "Personal computer" each time. Therefore, when the dictionary information processing portion 15 registers a class commonly utilized in the Personal computer purchasing department as a synonymous class for the Personal computer purchasing department like a bookmark, the Personal computer purchasing department can easily jump to a necessary product classification (class).

In the example shown in FIG. 4, the dictionary information processing portion 15 creates a class tree for the purchasing department as a dictionary, creates a Personal computer purchasing department of product classification Z02 under the purchasing department of product classification Z01, and sets Z03 and Z04 under product classification Z02 as synonymous classes of T04 and X03, respectively.

Figure 6:
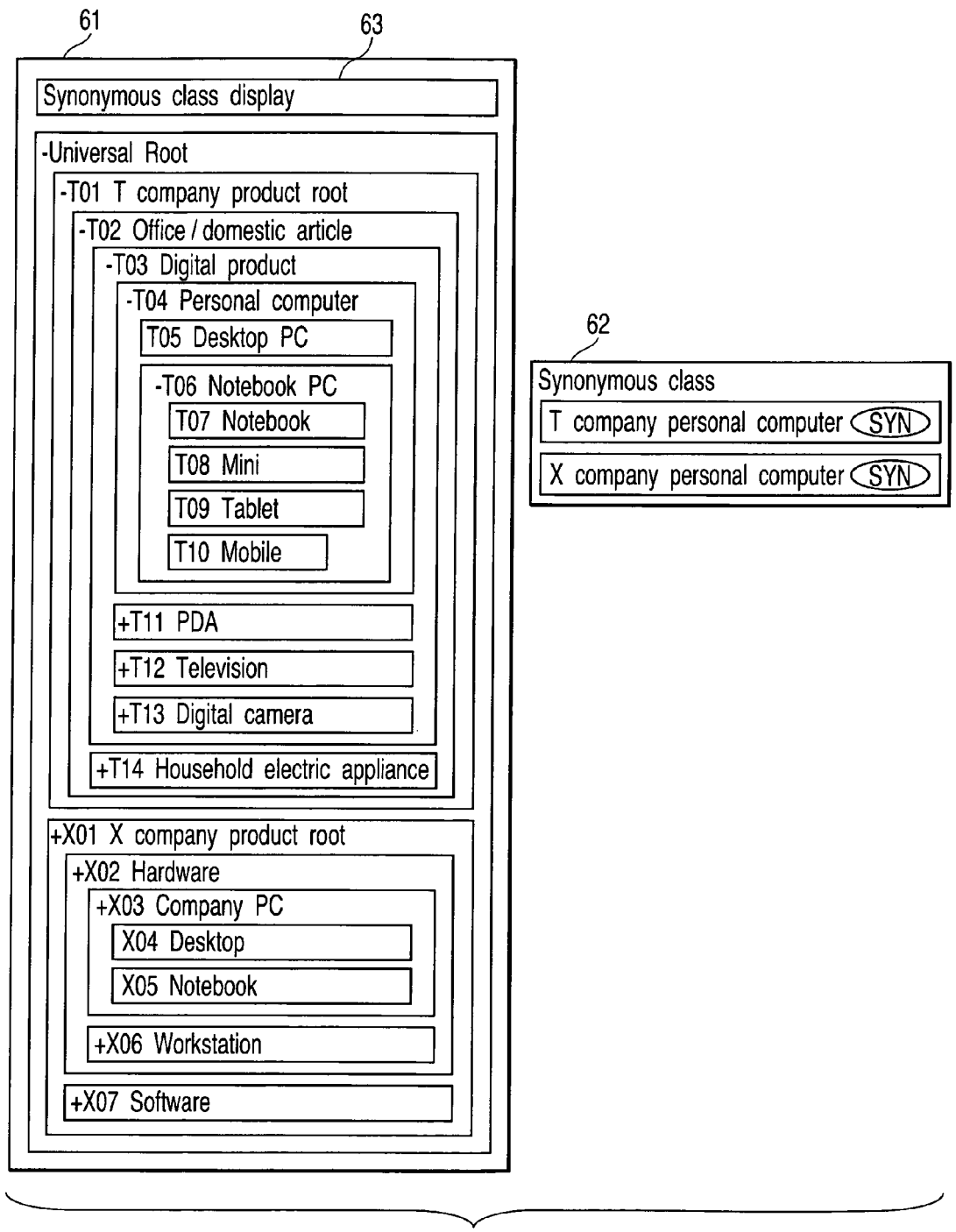
FIG. 6 is a view showing an example where synonymous classes are displayed in another window according to the first embodiment.

FIG. 6 shows an example where synonymous classes are displayed in another window. As shown in FIG. 6, the dictionary information processing portion 15 displays the synonymous classes in a synonymous class display portion 62 as a window different from class tree display portion 61. This synonymous class display portion 62 may be displayed when the user selects a button 63, for example.

As described above, in this embodiment, when it is confirmed that substantial classifications are the same between a plurality of different classification systems by any method, an actual content is set in one of these classes, and any other classes are processed as "synonymous classes" which have different codes but the same meaning. As a result, it is possible to avoid double registration having the same content with different names or classification codes.

Effects and advantages of this embodiment will now be described taking ISO 13584 Parts Library ("PLIB") standards. In the PLIB standards, there is no concept of synonymous classes. Based on the PLIB standards, sources of concepts throughout the world can be uniquely specified by using codes of communities (Supplier_BSU) which issue classifications uniquely determined according to the ISO 6523 International Code Designator (ICD) standards, codes of classes (Class_BSU) issued by such communities, and codes allocated to properties (Property_BSU) defined in accordance with each class and inherited to sub-classes. The same concept is not expressed by using two different codes and there is no such a need as long as sets of Supplier_BSU and Class_BSU and sets of Supplier_BSU, Class_BSU and Property_BSU are used.

In reality, however, there are community standards which do not accurately comply with the PLIB standards. Further, it is often the case that classifications in companies differ depending on a difference or convenience in production or sales organization systems in companies. In order to avoid a confusion based on such a difference in classification, names or identification codes different from the classification of other companies may be intentionally allocated in some cases. Therefore, uniform classifications using the PLIB standards only cannot be expected.

Thus, in this embodiment, a classification code system which does not accurately comply with the PLIB standards is associated with the ISO 13584 standards. Furthermore, when it can be judged that the classification in this classification code system is substantially the same as a class classified based on the ISO 13584 standards by definition, the classification class in the GUI is processed as a different class mark having a code different from the PLIB standards. Content (instance) is generated as the same classification in the dictionary information storage portion 19. Therefore, the problem of double registration of the content can be avoided. Moreover, it is possible to avoid a problem that search is possible from one classification but it is impossible from the other classification even though these classifications have the same concept.

The thus created synonymous class which is classification information as a header is written by using CASE_OF which is defined based on ISO 13584-Part42 standards. Alternatively, the synonymous class can be written as dictionary information complying with the international standards in a format specialized while maintaining the upward compatibility with ISO 13584-Part42 (standards, Vol. No. 42) standards which define a dictionary format.

As a result, in any other database system or library management system (LMS), the synonymous class can be realized by transferring the same classifications. The synonymous class is a classification and an expression of a class which is commonly used with respect to users who belong to a given community or organization. Therefore, it is very important to output a file as a different classification system and read this file to any other database or LMS so that the same classification can be utilized.

Collateral information which is required to write the synonymous class as an entity independent from the regular class is associated with the synonymous class, and the synonymous class can be generated by reading identification information of the synonymous class and the regular class written in the collateral information.

As described above, according to this embodiment, class code which is independent from class code allocated to the regular class is allocated together with class code of the regular class, the identification information which is used to identify the synonymous class from the regular class is associated. Therefore, the synonymous class forming a hierarchical structure independently from the regular class is displayed in such a manner that the synonymous class can be distinguished from the regular class by reading the identification information. As a result, information associated with a given classification can be referred to and utilized from any other standard classification. Here, the collateral information is, e.g., (i) definition information of a given classification, (ii) definition or data type information of a property which belongs to a given classification, (iii) data values of all or part of properties of instance data which belongs to a given classification or a content table which is a set of instance data. With this identification information, the synonymous class can be distinguished from the regular class in an internal expression in the computer.

As a result, a given group of users can trace a classification structure in accordance with a dictionary which conforms to customs or rules in the group. Further, users can identify and select classifications by using familiar classification symbols or standard names.

(i) In a hierarchical structure of a database which performs output by the system, a synonymous class is written as an entity different from a regular class. This is also applied to a description of a hierarchical structure in input/output files. That is, a synonymous class can have a name, a code, a defined community of the synonymous class, or a utilized organization and any other collateral information independently of a regular class. (ii) A synonymous class can be automatically generated in the system by the description of the synonymous class written in a file input to the system. Further, (iii) a file used in (i) and (ii) is read to any other database so that the same synonymous class can be automatically generated in this database.

SECOND EMBODIMENT

FIGS. 7 to 10 are views illustrating a second embodiment of the present invention. It is assumed that class "Z03: T company personal computer" and class "T04: Personal computer" have a relationship between a synonymous class and its source class.

Figure 7:
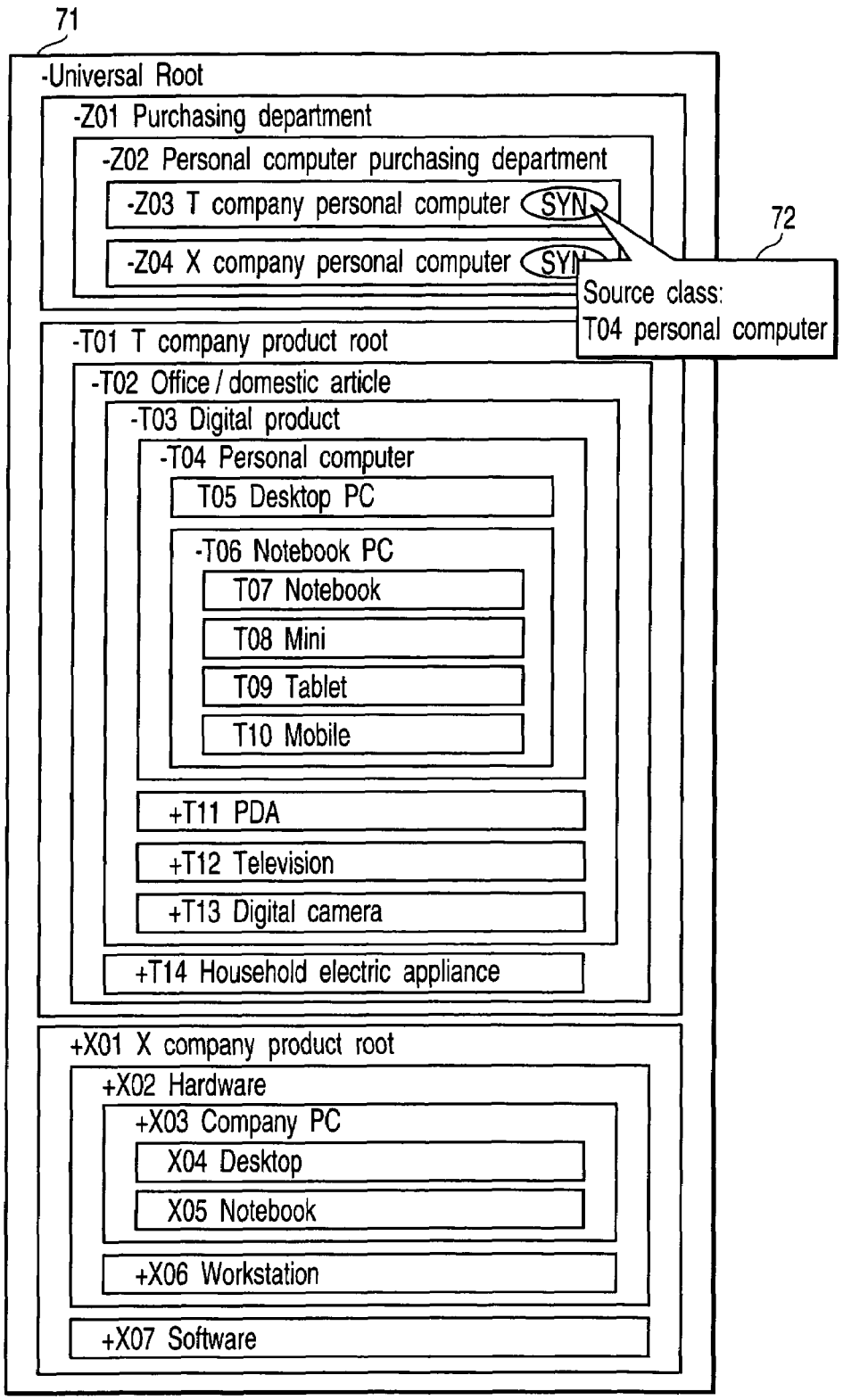
FIG. 7 is a view showing an example where a code of source class is displayed by using a balloon according to a second embodiment of the present invention.

FIG. 7 is a view showing a display example of source class. When the user performs an operation for putting a mouse cursor on a synonymous class in class tree display portion 71 in FIG. 7 by using the input portion 12, class code or the like of the source class is displayed by using a balloon 72 or the like. In the example of FIG. 7, the balloon 72 shows the class name and class code. When a synonymous class is selected by the input portion 12 in this manner, the dictionary processing portion 15 or the class edit processing portion 16 displays class code of a regular class as the source class together with class code of the synonymous class.

Figure 8:
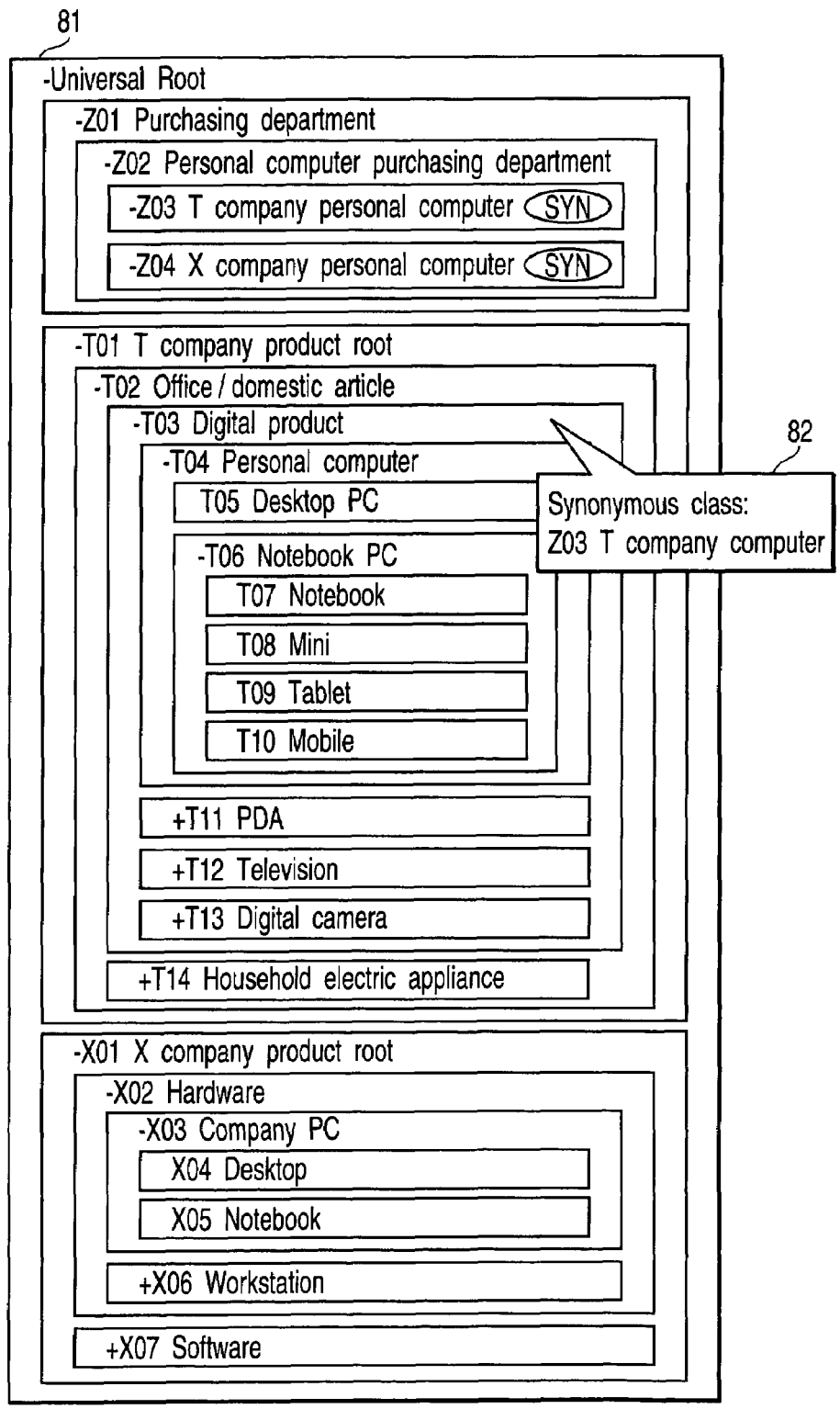
FIG. 8 is a view showing an example where a synonymous class is displayed in a balloon according to the second embodiment.

FIG. 8 is a view showing a display example of a synonymous class. When a cursor is placed on source class in class tree display portion 81 shown in FIG. 8, class code or the like of the synonymous class is displayed by using a balloon 82 or the like. In the example shown in FIG. 8, the balloon 82 shows the class name and class code. When a regular class is selected by the input portion 12 in this manner, the dictionary processing portion 15 or the class edit processing portion 16 displays class code of the synonymous class together with class code of the regular class which is source class.

Moreover, when there is a special display request, there can be adopted a method which displays a code of source class as a sub-class of each synonymous class in class tree or a method which displays a synonymous class as a sub-class of source class.

FIG. 9 is a view showing a screen example where source class is displayed. In a class tree display portion 91 shown in FIG. 9, when, e.g., a button 33 is selected, the dictionary information processing portion 15 displays source class "T04: Personal computer" like a sub-class of a synonymous class "Z03: T company personal computer".

FIG. 10 is a view showing an example of a screen which displays a synonymous class. When, e.g., a button 34 is selected in a class tree display portion 96 in FIG. 10, the dictionary information processing portion 15 displays a synonymous class like a sub-class of source class "T04: T company personal computer". The source class and the synonymous class displayed like a sub-class clearly indicate that they are source class in a synonymous class or a synonymous class in source class, respectively, by differentiating display from that of a regular sub-class, e.g., by using italic type or displaying a mark as well.

The respective display methods in the synonymous class and its source class are not restricted to those described above, and there can be considered various methods such as a method of displaying classes in another screen by right click or the like in place of displaying a balloon, a method or displaying classes in the class information display area 102 in FIG. 1 and others.

As described above, according to this embodiment, class code of a regular class can be displayed as a reference target code of a synonymous class, and a code of a synonymous class can be displayed as a synonymous class code (a synonymous classification code).

THIRD EMBODIMENT

This embodiment relates to an embodiment in which a synonymous class is written by utilizing CaseOf in a dictionary which can be defined based on the ISO 13584 standards.

A dictionary which can be defined based on the ISO 13584 standards is a simple tree. That is, classes form a simple inheritance relationship in which they have one super class only. However, there is a concept of CaseOf which can import a plurality of properties which can be used by each of a plurality of classes from the plurality of classes. A partial inheritance is enabled between classes by utilizing CaseOf.

The dictionary processing portion 15 or the class edit processing portion 16 generates a class tree by making reference to CaseOf.

Figure 11:
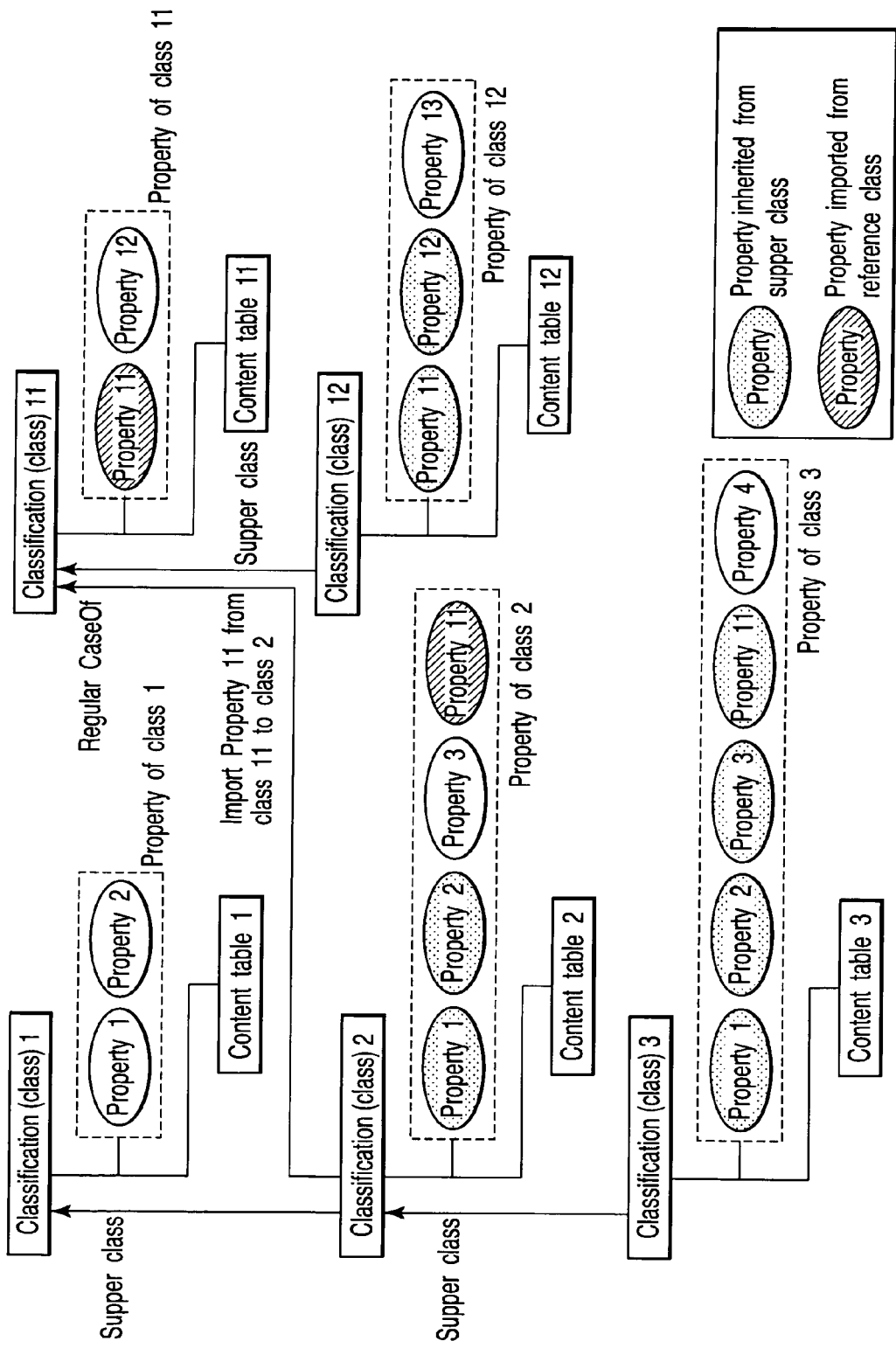
FIG. 11 is a view showing an example of a class tree according to a third embodiment of the present invention.

FIG. 11 is a view showing an example of a class tree according to this embodiment. In FIG. 11, class 1, class 2 and class 3 are simple trees and they are coupled with each other in a hierarchical relationship of a simple inheritance. Class 11 and class 12 are also simple trees, coupled with each other in a hierarchical relationship, and inherit properties of super classes.

In FIG. 11, the properties with a dot-printed background are indicative of properties inherited from super classes. That is, class 2 has a property 1 and a property 2 inherited from class 1. In this manner, this embodiment forms a multi inheritance relationship in which a sub-class inherits properties from a plurality of super classes.

Class 2 is defined by a CaseOf class, and imports a property 11 from class 11. By importing the property, class 2 can then utilize property 11 as its own property.

It should be noted that a class which is referred to based on CaseOf (a regular class) will be referred to as "reference class" and an imported property will be referred to as an "imported property" in the following description of this embodiment. In the example of FIG. 11, "reference class" is class 11, and "imported property" is property 11.

In this embodiment, the expression of a synonymous class utilizing a reference relationship between classes is possible by expanding the concept of CaseOf.

FIG. 12 is a view showing a description example of dictionary information based on the ISO 13584 standards utilizing a Part21 file format. Data is written in Part21 file based on a schema using EXPRESS defined based on the ISO 13584 standards. The schema has an entity as a basic unit constituting the schema and its attribute. Each entity has a name.

In the description following "DATA;" on the middle stage in FIG. 12, a number prefixed by a hash mark at the top of each line is a number allocated to each entity, and the entity can be thereby identified. An entity name follows the sign of equality. Attributes are aligned in a comma separated value format between parentheses after each entity name. A number prefixed by a hash mark which is written in the attribute means that reference is made to an entity defined in another line.

FIG. 13 is a view selectively showing a part describing class information in Part21 file. In FIG. 13, information concerning class "Z02: Personal computer purchasing department" is written in lines from #1026 to #1025 denoted by reference numeral 131. Information concerning class "Z03: T company personal computer" is written in lines from #1019 to #1018 denoted by reference numeral 132. Information concerning class "Z04: X company Personal computer" is written in lines from #1012 to #1011 designated by reference numeral 133.

An entity representing a CaseOf class is defined as a sub-entity of an entity expressing a regular class. The first to fifteenth entities representing CaseOf classes are attributes indicative of information of classes inherited from entities representing classes. The sixteenth and subsequent attributes are indicative of information of CaseOf.

That is, taking a line #1020 denoted by reference numeral 132 as an example, the first attribute "#1019" to the fifteenth attribute "$" are indicative of class information of "Z03: T company personal computer", and the sixteenth attribute "*" and subsequent attributes are indicative of information of CaseOf. Each attribute is indicative of information as follows:

The first attribute is indicative of a code which uniquely identifies a class, i.e., "Class BSU";

the fourth attribute is indicative of "Preferred name";

the eighth attribute is indicative of "Remark";

the ninth attribute is indicative of "Super class";

the twenty-first attribute is indicative of an identifier of a class which is referred to in CaseOf, i.e., "Reference class BSU"; and the twenty-second attribute is indicative of properties imported from the class which is referred to in CaseOf, i.e., a set of "imported properties".

Therefore, specifically, information which can be read from #1020 designated by reference numeral 132 and lines which are referred to by this line are as follows.

As apparent from the entity name, class type is a CaseOf class (component_class_case_of). "Class BSU" is Z03, "Standard name" is T company personal computer, "Remark" is $SYNONYM, "Super class" is Z02, and "Reference class" is T04. "Imported property" is indicative of null (no existence).

Even if the class information in Part21 file shown in FIG. 13 is read by the regular database management system based on the ISO 13584 standards, class Z03 is recognized as a regular CaseOf class having class T04 as a reference class. Further, "$SYNONYM" written in the attribute "Remark" does not have information other than a (human readable) character string which can be read by the user.

In this embodiment, a predetermined special character string "$SYNONYM" is written in "Remark" which is an attribute of the CaseOf entities. As a result, when information is read by the hierarchical database management system 100 according to this embodiment, a class of this character string is recognized as a synonymous class while its reference class is recognized as source class of the synonymous class, and the classes are stored in the dictionary information storage portion 19 so that the class can be processed as the synonymous class in the hierarchical database management system 100. That is, "$SYNONYM" in the remark column is recognized as identification information which identifies the synonymous class from other classes.

Moreover, since information indicative of the synonymous class is usually added by utilizing one of attributes of CaseOf entities, the compatibility of the regular Part21 file can be guaranteed.

As described above, in this embodiment, the synonymous class is written by using a class in a classification system different from a classification system of the hierarchical database and an entity which imports a property, the hierarchical database forms a simple inheritance structure in which a sub-class comprises only one super class, and the class edit processing portion 16 can process this structure as a multi inheritance relationship in which a sub-class comprises a plurality of super classes based on the hierarchical database.

FOURTH EMBODIMENT

This embodiment relates to an embodiment which writes a synonymous class by a technique different from that of the third embodiment.

In this embodiment, the synonymous class is written as a regular class rather than a CaseOf class. Additionally, a synonymous class is written by adding to the attribute "Remark" 1) information indicative of a synonymous class and 2) information which identifies source class.

FIG. 14 is a view selectively showing a part in which the class information is written in a Part21 file according to this embodiment. Lines denoted by reference numerals 141, 142 and 143 correspond to the description of lines designated by reference numerals 131, 132 and 133 in FIG. 13 of the third embodiment, respectively.

That is, information concerning class "Z03: T company personal computer" is written in lines of #1019 to #1018 designated by reference numeral 142. Information concerning class "Z04: X company Personal computer" is written in lines of #1012 to #1011 denoted by reference numeral 1403.

Taking a line #1020 denoted by reference numeral 142 as an example, class type is a regular class (Component_class) based on an entity name, "Class BSU" is Z03, "Standard name" is T company personal computer, "Remark" is $SYNONYM-140/T_Company//.T04-001, "Super class" is Z02, and "Import property" is null (non-existent). Like the example shown in FIG. 13, "$SYNONYM-140/T_Company//.T04-001" in "Remark" does not have a meaning other than a character string even if this is read by the regular database management system.

Conversely, in case of the hierarchical database management system according to this embodiment, for example, first eight characters in the attribute remark of class information written as a regular class related with $SYNONYM, the dictionary information processing portion 15 determines this class as a synonymous class, recognizes a character string from the ninth hyphen sign as an identifier of source class of the synonymous class, and stores the class in the dictionary information storage portion 19. As a result, this class can be processed in the hierarchical database management system 100 as the synonymous class.

Further, since information indicative of the synonymous class by utilizing one of attributes of CaseOf entities is usually added, the compatibility can be guaranteed as the regular Part21 file.

As described above, in this embodiment, a synonymous class is written by using a class of a classification system different from a classification system of the hierarchical database and an entity which imports properties, the hierarchical database forms a simple inheritance structure in which a sub-class comprises only one super class, and the class edit processing portion 16 can processes this structure as a multi inheritance relationship in which a sub-class comprises a plurality of super classes based on the hierarchical database.

For example, in case of input/output utilizing a file defined in the ISO10303-21 (a so-called "STEP file"), a class having a synonymous class code is written by utilizing a structure for import of classes or properties from any other classification system defined in the ISO 13584-24, i.e., "CASE_OF" (item_class_case_of, component_class_case_of, material_class_case_of and others) entities. Further, a comment or an annotation incidental to CASE_OF is used. As a result, a fact that this description is actually a synonymous class is clearly written, and the compatibility with the ISO 13584 standards can be maintained. Furthermore, the simple inheritance in which a class demanded by the ISO 13584 standards has only one super class can be maintained in an input/output file. Moreover, when data is once read, multi inheritance or multi classification is substantially enabled.

FIFTH EMBODIMENT

This embodiment relates to an embodiment of the description of a synonymous class utilizing a file format other than Part21 file format.

In the ISO 13584 standards, dictionary information is usually transmitted/received in the form of a Part21 file, but there is, e.g., a table-like dictionary description method using an XML format (Simplib), a class inquiry language (CQL) or CSV other than Part21 file. These description formats can likewise simplify and write entities and attributes in Part21 file, and hence the same processing as that of Part21 file according to the third embodiment or the fourth embodiment can be realized.

FIGS. 15 to 17 are views showing a description example of synonymous classes according to this embodiment.

FIG. 15 is a view showing examples of a table-like dictionary description mode using CSV or the like. As shown in FIG. 15, an attribute of an entity indicative of class information is determined as an item, information of one class is represented by one line of a CSV file. In case of FIG. 15, an entity name is written in "Class type". A special character string indicative of a synonymous class, e.g., SYNONYM_COMPONENT_CLAASS is written in "Class type". As a result, the hierarchical database system 100 can process a synonymous class which is different from any other regular class. Moreover, although a reference class of a CaseOf class is usually written in an item "Reference target class", source class of a synonymous class can be written by utilizing "Class type".

Likewise, the description method can be realized by writing synonym information in another item, e.g., "Remark" as mentioned above.

FIG. 16 is a view showing an example of performing a class definition in the class inquiry language (CQL). In FIG. 16, an example of performing a definition of a regular class is shown, and a "Remark" attribute includes synonym information (indication of a synonymous class, and information of source class).

FIG. 17 is a view showing another example of performing a class definition in the class inquiry language (CQL). In FIG. 17, an example of performing a definition of a CaseOf class is shown, a "Remark" attribute includes synonym information (indication of a synonymous class) and a is_case_of attribute includes source class information.

As described above, according to this embodiment, in cases where a synonymous class does not have an instance, when a file in which identification information indicative of a synonymous class is written is read, the class edit processing portion 16 can detect a synonymous class based on this identification information.

For example, indication of a synonymous class can be expressed by giving an additional attribute to a class as a reference target or additional information such as a special comment utilizing a column of Notes, remark and the like. As a result, indication of a synonymous class can be detected by inputting/outputting class To/from the data base in such a manner that the class can be distinguished from a regular class.

SIXTH EMBODIMENT

This embodiment is an embodiment concerning the description of a synonymous class using EXPRESS.

Figure 19:
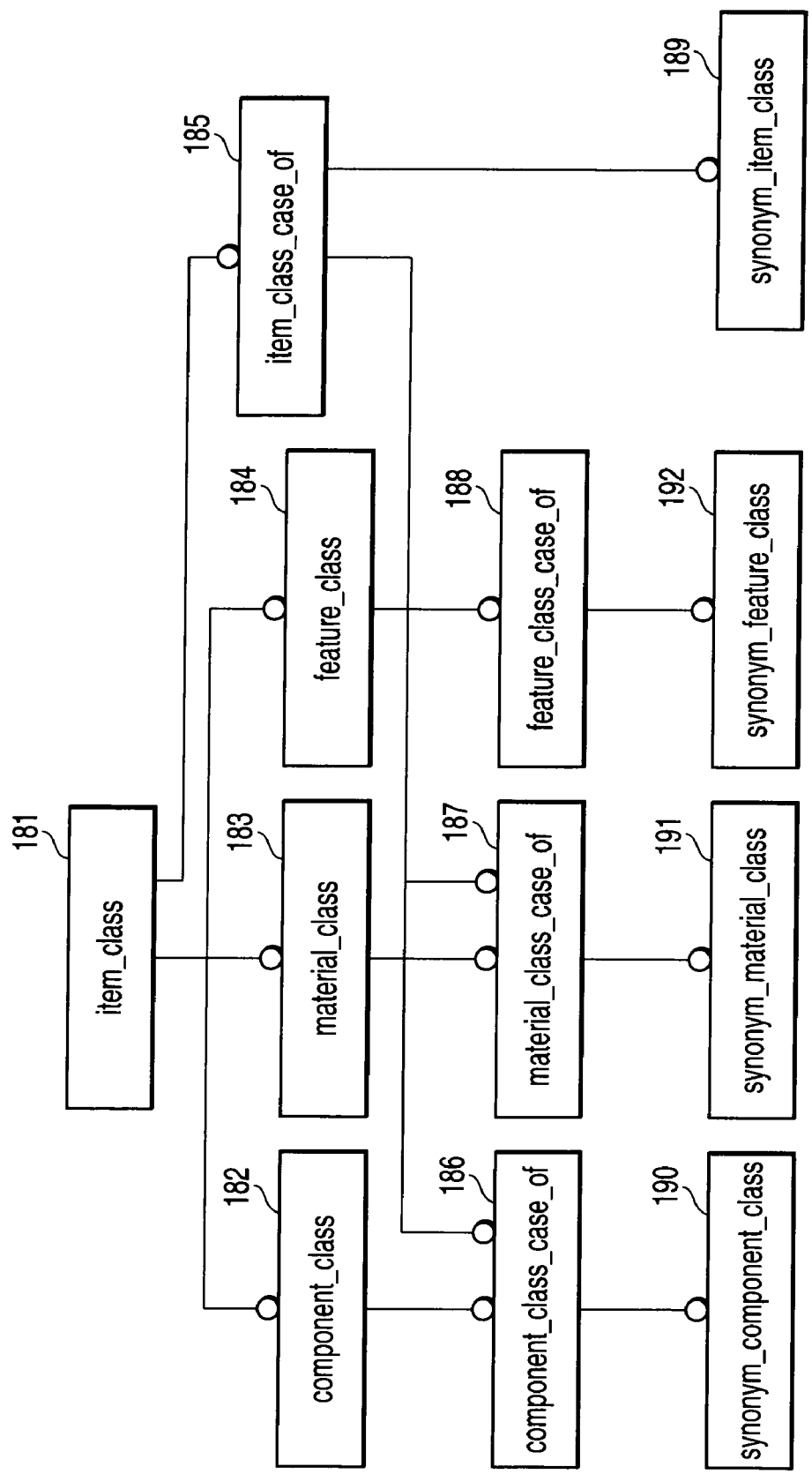
FIG. 19 is a view showing a description example of EXPRESS-G including associative entities according to the sixth embodiment.

FIG. 18 is a view showing an example of the description of a synonymous class using EXPRESS in which an entity defined in the ISO 13584 standards is extended. Additionally, FIG. 19 is a view showing a description example of EXPRESS-G including an associative entity. In the example shown in FIG. 19, synonymous classes (which are synonym_item_class 189, synonym_component_class 190, synonym_material_class 191 and synonym_feature_class 192, respectively) are extended and defined as low-order entities of CaseOf class entities (which are item_class_case_of 185, component_class_case_of 186, material_class_case_of 187 and feature_class_case_of 188, respectively) which are defined as low-order entities of regular class entities (which are item_class 181, component_class 182, material_class 183 and feature_class 184, respectively).

FIG. 20 shows an example where information is written in a Part21 file by utilizing extension entities depicted in FIG. 19. Reference numeral 201 denotes the description of definition information of class "Z02: Personal computer purchasing department"; reference numeral 202, the description of definition information of class "Z03: T company personal computer"; and reference numeral 203, the description of definition information of class "Z04: X company Personal computer".

As shown in FIG. 19 or 20, as low-order entities of the CaseOf classes, entities each representing a synonymous class are extended without adding attributes. That is, the synonymous class is defined as a sub-class of a regular class. As a result, information can be transmitted to a regular database management system complying with the ISO 13584 standards which do no interpret the synonymous class by just converting a synonymous name into a super entity.

Furthermore, in this example, although the entity is extended as a low-order entity of the CaseOf class, any other EXPRESS extension may be used. For example, the entity may be directly defined as a low-order entity of a regular class.

As described above, according to this embodiment, when a synonymous class does not have an instance and the synonymous class is defied in a hierarchical database as a sub-class of an entity defined in a classification system of the hierarchical database, the class edit processing portion 16 can detect indication of the synonymous class based on the sub-class.

SEVENTH EMBODIMENT

This embodiment relates to an embodiment in which synonymous information is given to another file.

FIGS. 21 to 24 are views illustrating the description of synonymous information according to this embodiment.

FIGS. 21 and 22 show a first description example, and FIGS. 23 and 24 show a second description example.

FIGS. 21 and 22 form a pair. FIG. 21 shows an example of a Part21 file in which a synonymous class is written as a usual class, i.e., a regular class. Reference numeral 211 denotes definition information of a class having class code Z02; reference numeral 212, definition information of a class having class code Z03; and reference numeral 213, definition information of a class having class code Z04. FIG. 22 is a view showing an example of a synonymous information file in which information to be used to recognize as a synonymous class a synonymous class defined as a regular class in FIG. 21 is described. An identifier (class BSU) of classes (classes Z03 and Z04 in FIG. 22) as synonymous classes and an identifier (class BSU) of classes (classes T04 and X03 in FIG. 22) as source classes are written in the synonymous information file shown in FIG. 22. At the time of reading Part21 file shown in FIG. 21 to the hierarchical database management system 100, when the dictionary input/output processing portion 14 reads the synonymous information file depicted in FIG. 22 as an auxiliary file together with Part21 file or read the synonymous information file before/after reading Part21 file, the hierarchical database management system 100 registers the classes having class codes of Z03 and Z04 as synonymous classes.

FIGS. 23 and 24 form a pair. FIG. 23 is a view showing an example of Part21 file in which a synonymous class is written as a regular CaseOf class. FIG. 24 is a view showing an example of synonymous information file in which information which is used to recognize as a synonymous class the synonymous class defined as the regular CaseOf class is written. A class identifier (class BSU) of classes (classes Z03 and Z04 in FIG. 24) as synonymous classes is written in the synonymous information file depicted in FIG. 24. At the time of reading Part21 file shown in FIG. 23 to the hierarchical database management system 100, when the dictionary input/output processing portion 14 reads the synonymous information file in FIG. 24 as an auxiliary file together with Part21 file or reads the synonymous information file before/after reading Part21 file, the hierarchical database management system 100 registers classes Z03 and Z04 as synonymous classes.

Therefore, by giving the synonymous class information in a file different from Part21 file, the regular database management system based on the ISO 13584 standards can process Part21 file without including the synonymous information.

As described above, according to this embodiment, when the synonymous class does not have an instance and the synonymous class is written by using a first file or database according to a first classification system of the hierarchical database, a second file or database according to a second classification system different from the first classification system and a third file or database in which synonymous reference information of the first classification system and the second classification system is written, the class edit processing portion 16 can detect indication of the synonymous class based on the synonymous reference information in the third file or database.

EIGHTH EMBODIMENT

This embodiment relates to an embodiment of display of a synonymous class.

Figure 25:
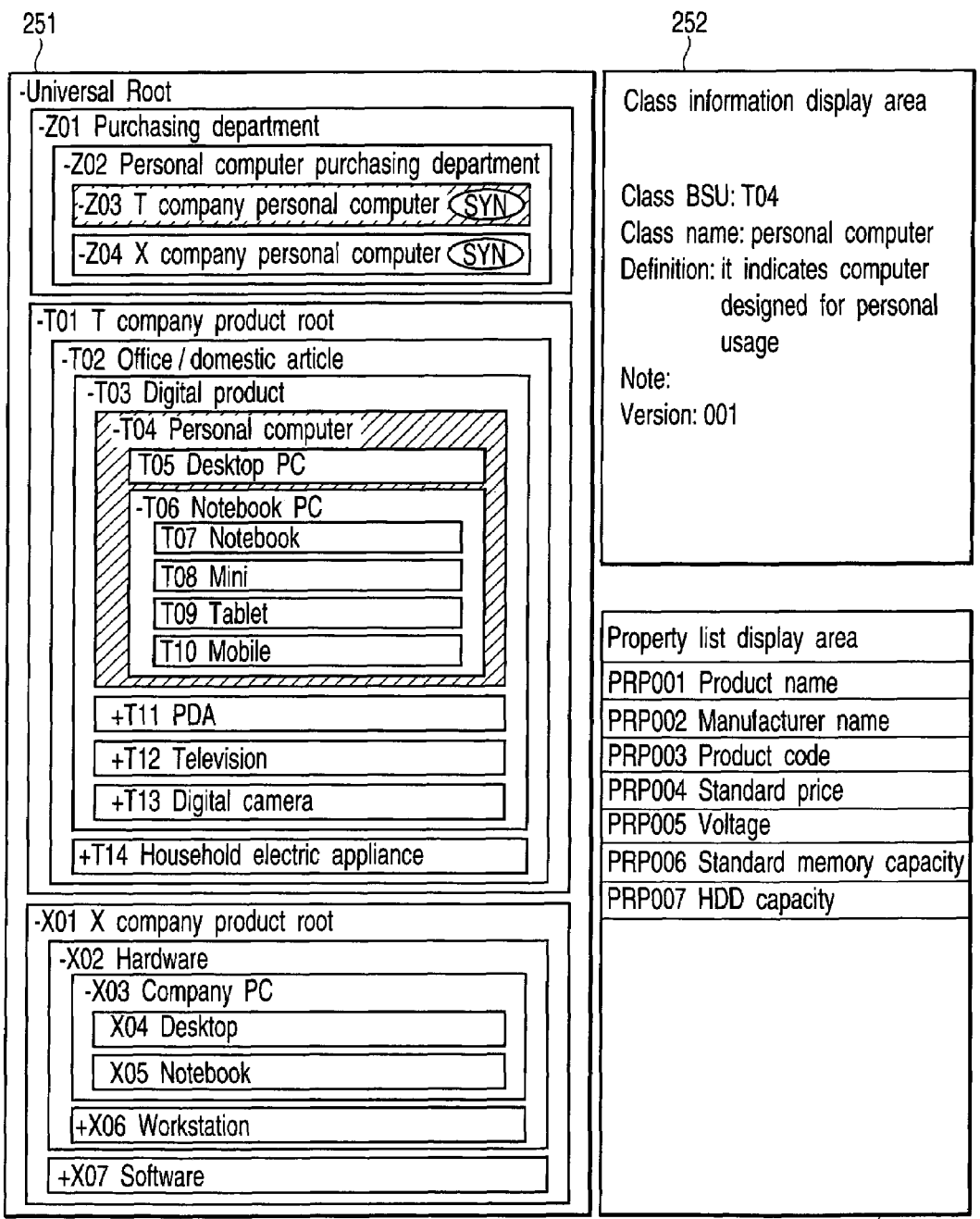
FIG. 25 is a view showing a display example of a synonymous class according to an eighth embodiment of the present invention.

FIG. 25 is a view showing a display example of a synonymous class according to this embodiment. This display example comprises a class tree display portion 251, a class information display area 252 and a property list display area 253.

Figure 26:
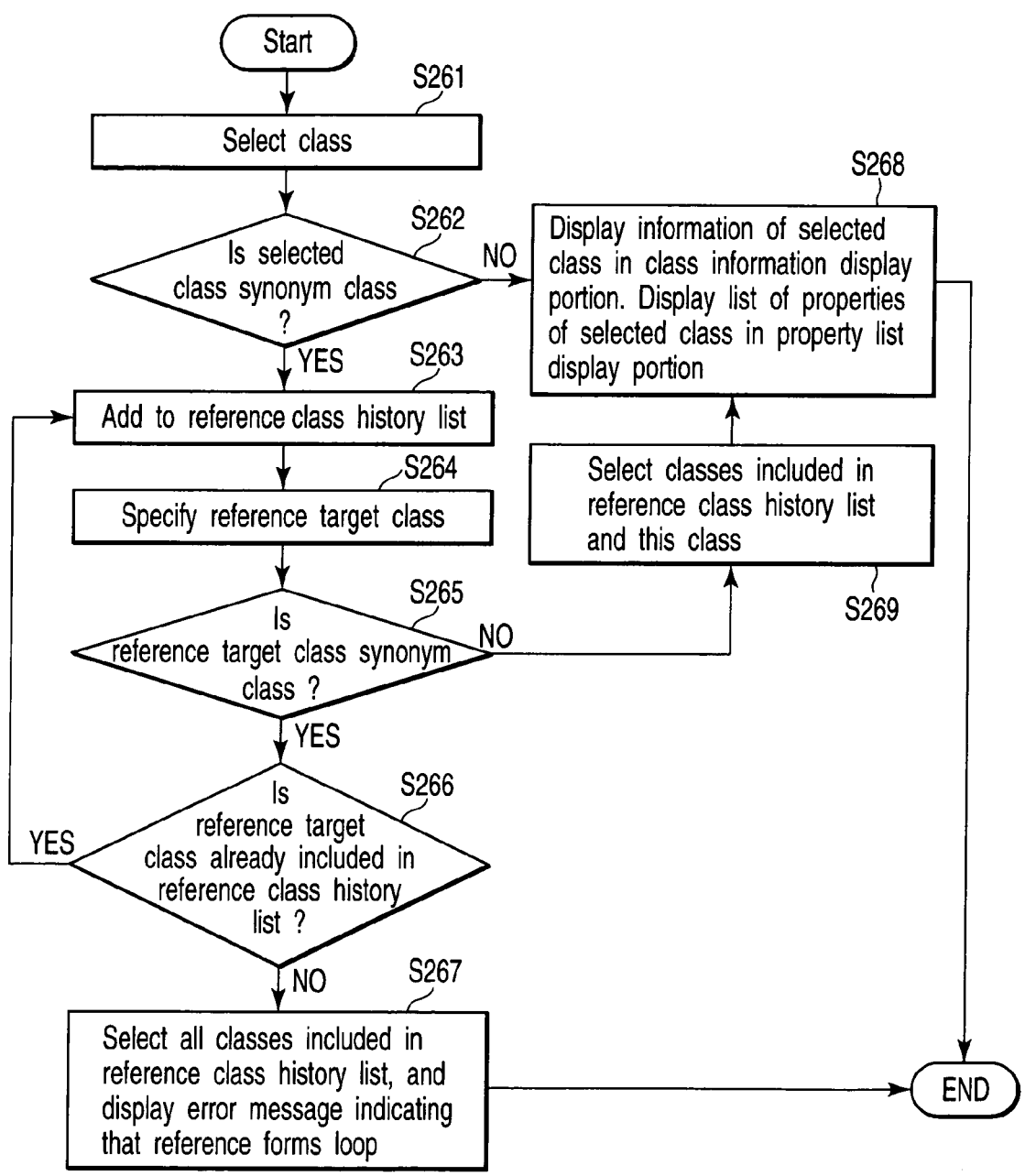
FIG. 26 is a view showing a flowchart of a synonymous class display operation according to the eighth embodiment.

FIG. 26 is a view showing a flowchart of a synonymous class display operation by the class edit processing portion 16.

As shown in FIG. 25, when the user selects a class by operating the input portion 12, e.g., by clicking a mouse in class tree display portion 251 (step 261), the class edit processing portion 16 judges whether this class is a regular class or a synonymous class (step S262). In case of the regular class, the class edit processing portion 16 displays class information or a property list of the selected class (step S268). If the selected class is a synonymous class, the class edit processing portion 16 adds the selected class in a reference class history list (step S263). Then, a reference target class of the class written in the reference class history list is specified by, e.g., making reference to the dictionary information storage portion 19 by the class edit processing portion 16 (step S264). Further, the class edit processing portion 16 judges whether the reference target class is a synonymous class (step S265). If it is not a synonymous class, the class included in the reference class history list and the reference target class are selected (step S269), information of these selected classes is displayed, and a property list of the selected classes is displayed in the property list display portion (step S268).

If the reference target class is determined as a synonymous class at the step S265, the class edit processing portion 16 judges whether the reference target class has been already included in the reference class history list (step S266). If the reference target class is not included in the reference class history list, the control returns to processing which adds the reference target class to the reference class history list (step S263). If the reference target class is included in the reference class history class, the class edit processing portion 16 selects all classes included in the reference class history list, and displays an error message indicating that the reference forms a loop (step S267).

By selecting the source class as well and displaying class information or a property list of the source class in this manner, the synonymous class serves like a bookmark, and the user can readily access the source class.

In the example shown in FIG. 25, when "Z03: T company personal computer" is selected, "T04: Personal computer" is also selected at the same time, and class information of "T04: Personal computer" is displayed in the class information display area 252 and the property list of T04 is displayed in the property list display area 253 by the class edit processing portion 16. This is the same as a screen in which T04 is selected except that the synonymous class Z03 is selected.

Furthermore, in cases where reference from the synonymous class to the source class in class tree display portion 251 takes such a conformation as shown in FIG. 9, when "Z03: Personal computer" is selected, the class edit processing portion 16 displays class information and a property list of class Z03. Another stage may be provided so that the class edit processing portion 16 can display class information and a property list of source class "T04: T company personal computer" which is an entity when "T04: T company personal computer" (italic type) virtually displayed below class Z03 is selected.

As described above, according to this embodiment, when the user selects a synonymous class displayed in the screen by using the input portion twelfth class edit processing portion 16 detects selection of this synonymous class so that a regular class which is referred to by the synonymous class can be read and displayed in the screen.

NINTH EMBODIMENT

This embodiment relates to an embodiment of automatic conversion of a search query.

Figure 27:
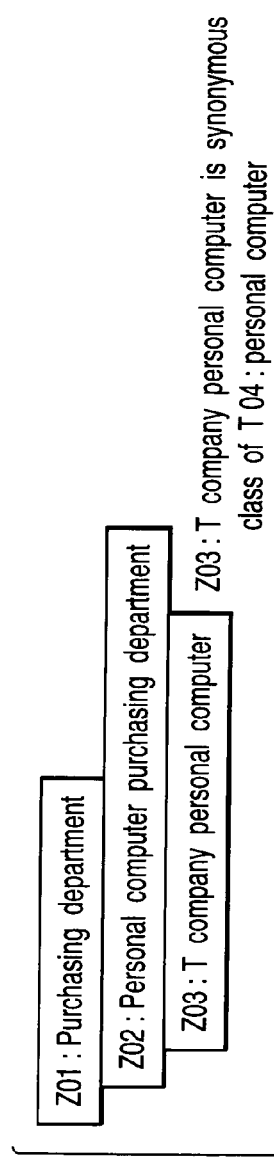
FIG. 27 is a view illustrating an automatic conversion function according to a ninth embodiment of the present invention.

FIG. 27 is a view illustrating an automatic conversion function of this embodiment.

In this embodiment, a synonymous class does not have instance data. Even if a synonymous class has such data, the data is just supplementary information of instance data existing in source class, and it does not have any meaning.

It is assumed that a class tree is formed as shown in FIG. 27. That is, it is assumed that class "Z03: T company personal computer" is a synonymous class of class "T04: Personal computer". Moreover, it is assumed that a content table Table01 as a set of instance data exists in sub-class "T05: Desktop PC" of source class "T04: Personal computer", and content table Table02 exists in sub-class "T06: notebook PC".

It is assumed that the following (1) content search query is requested to T04 which is a regular class, for example.

Select PRP001, PRP003 from T04* where
  PRP006=512; (1)

In response to this search query (1), the class edit processing portion 16 displays a Product name and Product code as properties of instance data whose memory is 512 instance data existing in class T04 and subsequent classes (T04, T05 and T06 in this example). That is, instance data of Equium 01 and Equium 03 in Table01 and Dyna 001 in Table02 is displayed as a result.

Even if display of the instance data is executed with respect to the synonymous class having class code Z03, the class edit processing portion 16 outputs a result obtained by performing display with respect to the source class having class code T04 rather than the instance data existing in Z03 and subsequent classes. That is, the class edit processing portion 16 reads that the class having class code Z03 is a synonymous class and its source class has class code T04 from the written information shown in FIG. 5 in response to the following search query (2), and executes the search query (1) in which the class having class code Z03 is converted into the class having class code Z04.

Select PRP001, PRP003 from Z03* where
PRP006=512;     (2)

Although the above-described example corresponds to processing when a synonymous class is selected as a search target of instance data, processing is likewise executed with respect to source class of a synonymous class when another processing request is generated with respect to the synonymous class.

As described above, according to this embodiment, when the class edit processing portion 16 detects that the target of an operation using the input portion 12 or of data processing is a synonymous class, processing of a regular class which is referred to by the synonymous class is executed. As a result, the processing of the regular class which is referred to by the synonymous class is facilitated.

In an operation of, e.g., selecting a copy or a search target of instance data, this embodiment can be utilized when directly selecting a target in the GUI. Alternatively, this embodiment can be used when writing a target using a code or a symbol in an operation of writing a processing request in an application programming interface (API).

TENTH EMBODIMENT

This embodiment relates to an embodiment showing concrete processing concerning a synonymous class.

Figure 28:
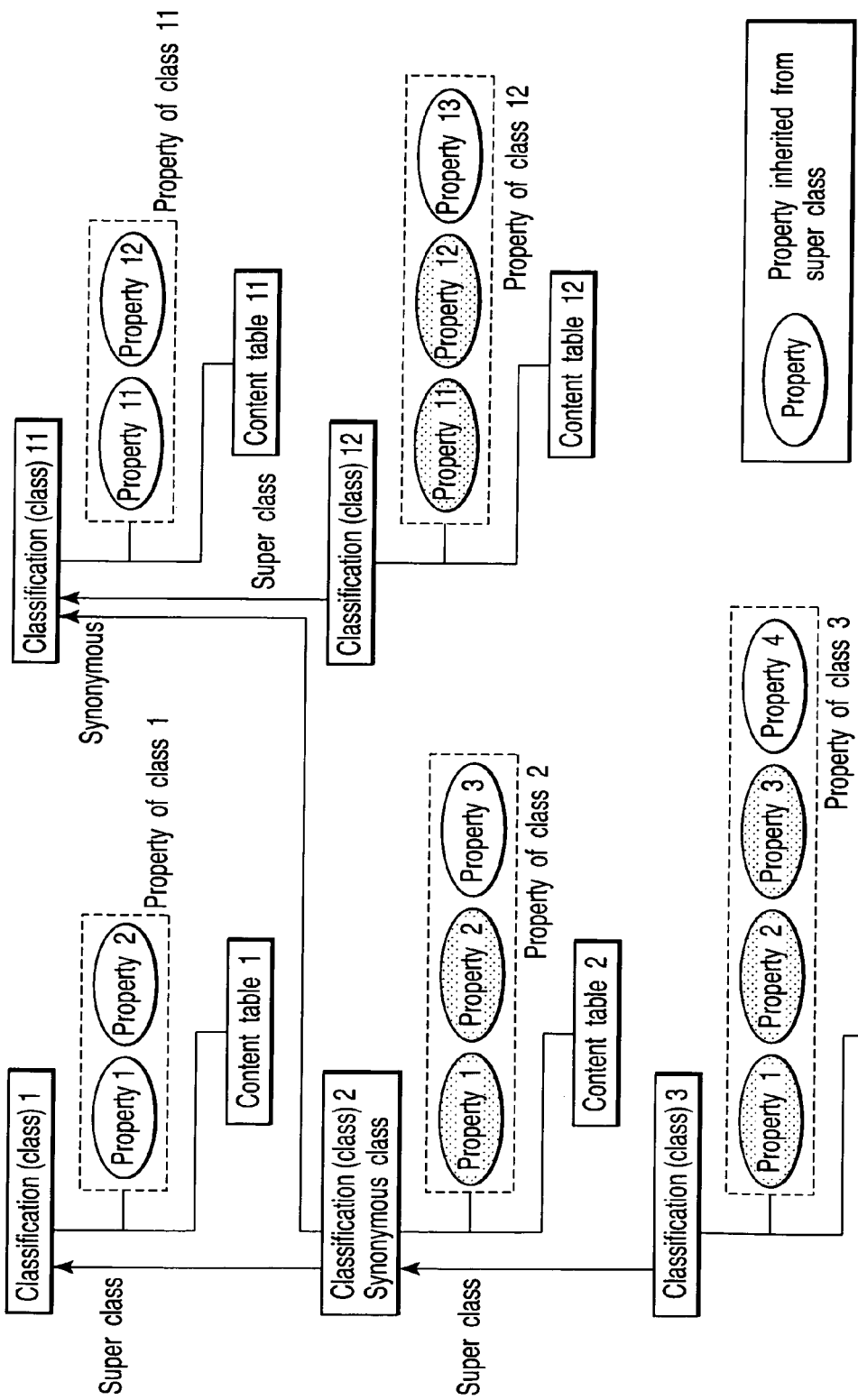
FIG. 28 is a view showing a relationship between a synonymous class and source class according to a tenth embodiment of the present invention.

FIG. 28 is a view showing the relationship between a synonymous class and source class.

It is determined that class 2 is a synonymous class. Source class of class 2 is class 11. Since class 1, class 2 and class 3 have a super/sub hierarchical relationship, properties of a super class are inherited. Further, although class 11 is source class of synonymous class 2, it is a regular class. Class 11 has class 12 as a sub-class.

The synonymous class and the source class independently form hierarchies, import of properties is not allowed, and these two types of classes do not interfere with each other. However, processing with respect to the synonymous class is executed as processing with respect to the source class. Furthermore, the synonymous class does not have instance data indicative of regular product information or the like. Even if the synonymous class has such data, it is just auxiliary information of instance data of the source class.

It should be noted that inhibition of import or inheritance of properties or the like between the synonymous class and the regular class is notified to the user by displaying a message indicating such inhibition of inheritance or the like when the class edit processing portion 16 detects an operation in the GUI requesting such import or a description in an input/output file. Of course, the class edit processing portion 16 does not execute data processing including such inheritance or the like.

As described above, since the synonymous class takes a conformation that it just represents reference to the source class, overlapping distribution of instance data can be avoided as different from a case where equivalent classes are prepared by using two dictionaries. Moreover, in a relationship between a CaseOf class which makes reference and a reference class which is referred to, although these classes can respectively create instance data, if there is a change in imported properties defined in the reference class, there is a problem that reflection in the CaseOf class is not easy, for example. However, this problem has an advantage that a change in properties of the class which is referred to does not need to be taken into consideration by inhibiting creation of instance data and import of properties in the synonymous class which makes reference.

Although various methods of registering a synonymous class in the hierarchical database management system 100 according to the present invention are described, registration of import properties and usual instance data can be ignored or rejected with respect to the synonymous class in registration in order to provide the advantage.

As described above, in this embodiment, a reference relationship based on import of properties or partial inheritance of properties from one dictionary system to the other dictionary system is maintained in the two dictionary systems, and inheritance of properties is independently performed in each dictionary. For example, it is assumed that there are dictionary 1 and dictionary 2 and there are a plurality of sets of properties to be inherited. Additionally, it is determined that a parent-child(super-sub) relationship between classes is determined by using one of the sets of properties, i.e., a graph structure constituting classes belonging to the dictionaries is determined. In this case, a property which is required to determine this parent-child relationship is referred to as a classification property of the dictionary. A property P1 imported from dictionary 1 does not affect a dictionary structure of dictionary 2 unless property P1 is incorporated in classification properties of dictionary 2. In classes, a scheme of dividing properties to be inherited into a plurality of sub-groups and respectively inheriting these properties has been already described in detail as "inheritance of a plurality of typical properties" in Jpn. Pat. Appln. No. 2002-339929. This embodiment applies this "inheritance of a plurality of typical properties" to a reference relationship of classes between different dictionaries. In this case, there are provided a technique and structure which uniquely constitute a class sorting system in a plurality of dictionaries while realizing inheritance of properties.

As described above, according to this embodiment, when a regular class has a first property and a synonymous class has a second property, a first inheritance property which is inherited from a first super class to a first sub-class is set in a first classification system including the regular class and, at this time, the first classification system can be set to the first sub-class so that a second property of the synonymous class is not inherited. Further, a second inheritance property which is inherited from a second super class to a second sub-class is set in a second classification system including the synonymous class and, at this time, the second classification system can be set to the second sub-class so that the first property of the regular class is not inherited.

ELEVENTH EMBODIMENT

This embodiment relates to an embodiment utilizing a content view table.

Figure 29:
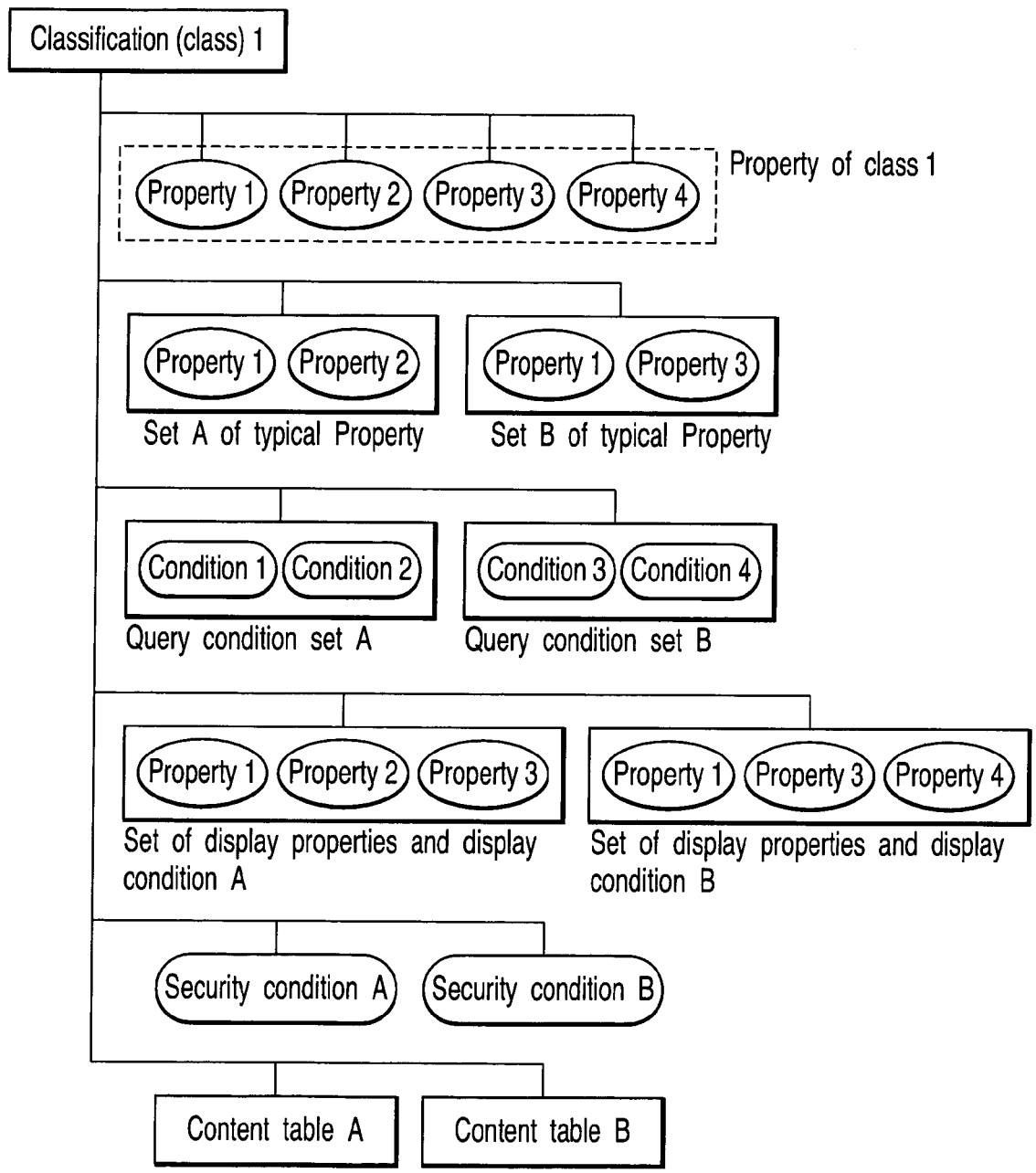
FIG. 29 is a view showing various kinds of information of a class according to an eleventh embodiment of the present invention.

FIG. 29 is a view showing various kinds of information that a class has.

A class has a content table which is a set of instance data as well as properties. Besides, the class has a set of typical properties, a set of display properties and conditions for search or display of instance data such as a display condition (a display order or the like), a query condition or a security condition. Such a condition for search or display of instance data (a processing condition) will be referred to as a content table view that a class has hereinafter. It should be noted that this content table view is inherited from a super class to a sub-class in accordance with a hierarchical structure like properties.

The typical property is a property which should particularly attract the user's attention. This typical property is, e.g., a property which requires or recommends input of conditions at the time of search or a property which requires or recommends input at the time of registration of instance data, but it is different from a key property which uniquely identifies instance data. The typical property may be displayed differently from any other property as described in Jpn. Pat. Appln. No. 2002-339929. For example, it may be displayed with a mark given to a property name thereof.

The display property means a property which is displayed to the user from a property set forming a content table. The display condition means, e.g., a display order in display properties. The query condition means a condition which is required to narrow down whether instance data is displayed in instance data which is an element in the content table. Furthermore, the security condition restricts the above-described various conditions in accordance with each user or group.

Figures 30, 31:
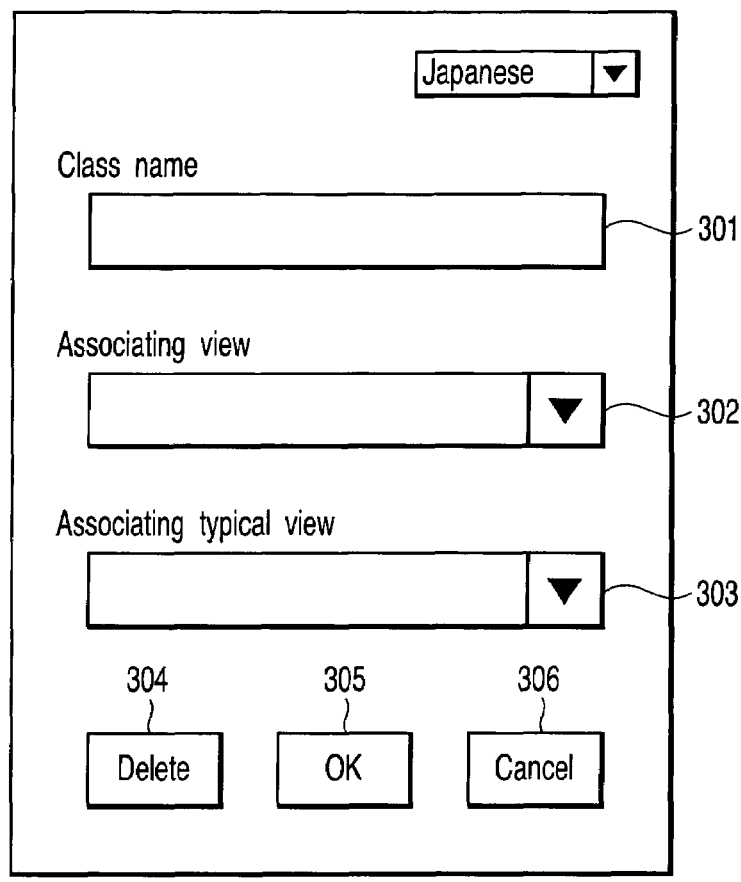
FIG. 30 is a view showing an example of a GUI which associates two content table views with each other according to the eleventh embodiment.
FIG. 31 is a view showing a display example of a content table view according to the eleventh embodiment.

For example, it is assumed that sets of typical properties are PRP001, PRP002 and PRP003, sets of display properties are PRP001, PRP002 and PRP008, a query condition is PRP006>=512 and a security condition is applied to all members in Table01 shown in FIG. 27. In this case, these content table views are combined with each other, and the content table is displayed to all users by the content table view setting processing portion 17. FIG. 31 is a view showing a display example of this content table view. In the example of FIG. 31, since preference is given to the typical properties over the display properties, PRP003 which is included in the set of typical properties but not included in the set of display properties is also displayed, but preference may be given to the display properties.

The plurality of content table views may be created with respect to one class by the content table view setting processing portion 17, and any content table views may be combined with each other and associated with classes.

Figure 32:
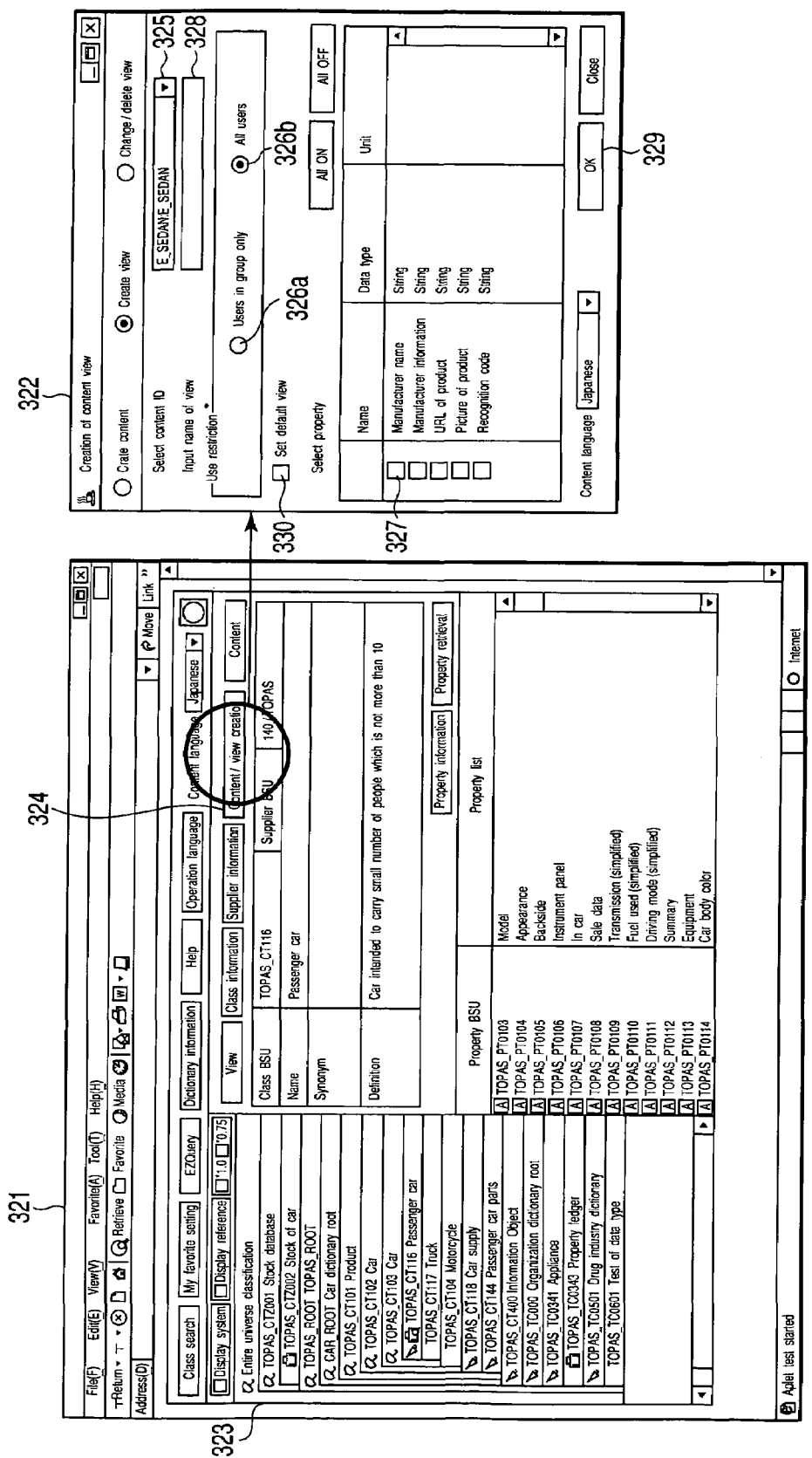
FIG. 32 is a view showing an example of a GUI which is used to register a content table view according to the eleventh embodiment.

FIG. 32 is a view showing an example of the GUI which is used to register a content table view. FIG. 33 is a view showing an example of a setting file which is used to register a content table view. A content table view may be registered from such a GUI as shown in FIG. 32 by the content table view setting processing portion 17, and may be registered by the content table view setting processing portion 17 using such a setting file as shown in FIG. 33. The setting file shown in FIG. 33 can also process a combination of a plurality of types of content table views.

FIG. 32 shows an example of a GUI which creates a content table view by combining a set of display properties, a security condition and a table content. When the user selects a class in a class tree display portion 323 in a main screen 321 and selects a content/view creation button 324, the content table view setting processing portion 17 displays a screen 322 which is used to set a content table view with respect to the selected class. In the screen 322 in which a content table view is set, a list of content tables existing in the selected class is displayed in a pull-down menu 325 by the content table view setting processing portion 17. The user determines a content table to be combined by selecting one content table. The security condition is set by using radio buttons 326a and 326b, and a check-box 327 is selected, thereby determine a set of display properties. Moreover, a name of the content table view is input in a text box 328, and an execution button 329 is selected, thereby completing setting of the content table view.

By selecting a check box 330, the content table view setting processing portion 17 sets the setting data as a default content table view, and this data is used to display the content table even if it is not associated with classes.

In the typical setting file shown in FIG. 33, setting of the content table view in which the set of typical properties, the display condition of properties (the display order) and the query condition are combined is performed. In the file, an identifier of properties and a search condition are written as one line, all written properties are the set of typical properties, and the written order is the display order of properties. When Table01 shown in FIG. 27 is displayed in accordance with the content table view set in this file, the display content is as shown in FIG. 31.

FIG. 30 shows an example of the GUI which is used to associate the content table view set in FIG. 32 in which the set of display properties, the security condition and the table content are combined with the content table view set in FIG. 33 in which the set of typical properties, the display condition of properties and the query condition are combined. The content table view set in FIG. 32 is selected in an associating view box 302 in FIG. 30, and the content table view set in FIG. 33 is selected in an associating search view box 303 in FIG. 30.

The screen shown in FIG. 30 is called from, e.g., class tree display portion 323 after selecting a class by the content table view setting processing portion 17. In this case, the selected class is automatically displayed in the class name box 301. Further, a set of content table views defined in this class is displayed in the pull-down menu of the boxes 302 and 303, and the user is allowed to select a combination, thereby associating the respective content table views. Moreover, commands of delete of each class or content table view, determination of association, association canceling processing are executed by selecting buttons 304 to 406.

As described above, the content table view setting processing portion 17 can set the processing condition (the content table view) for a synonymous class or a regular class, associate the set processing condition with a synonymous class or a regular class and store it in the association information storage portion 22, and perform processing of, e.g., displaying a synonymous class or a regular class under the stored processing condition. That is, by setting indication of a synonymous class by using the GUI and inputting/outputting this class to the database in such a manner that the synonymous class can be distinguished from a regular class, indication of the synonymous class can be detected.

For example, a condition for selecting a standard component or a recommended component in a company or any other display condition can be set in the GUI or a file.

TWELFTH EMBODIMENT

This embodiment relates to an embodiment of a concrete technique of setting a synonymous class.

Figure 34:
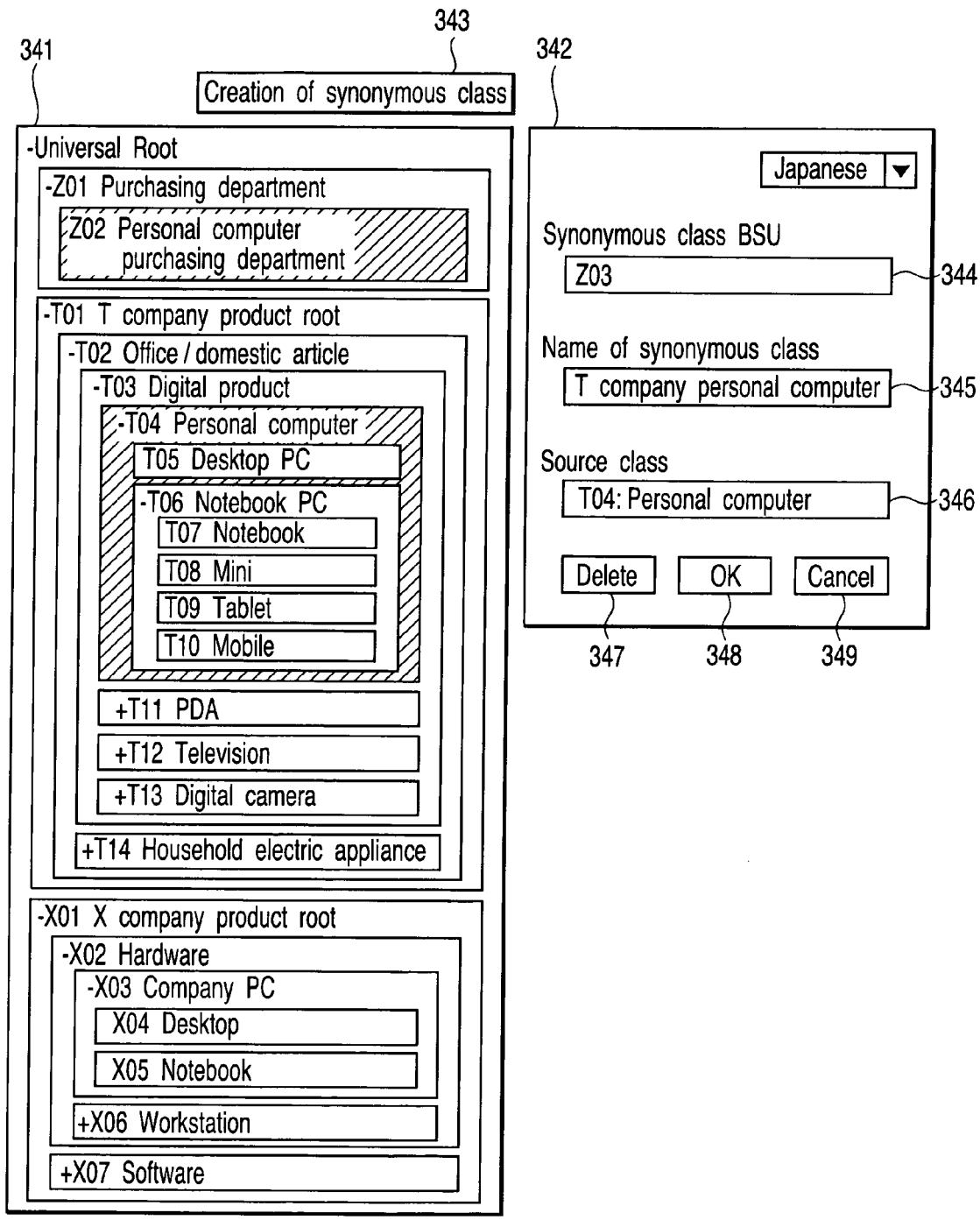
FIG. 34 is a view showing a screen display example for a concrete setting of a synonymous class according to a twelfth embodiment of the present invention.

FIG. 34 is a view showing a display example of a screen which is used for concrete setting of a synonymous class according to this embodiment.

When class Z02 in which a synonymous class is created is selected in a class tree display portion 341 and a synonymous class creation button 343 is selected, a synonymous class setting portion 342 is displayed. A BSU of a synonymous class to be created is input in a text box 344 in which a synonymous class BSU is input. Further, the same name is input in a text box 345 in which a synonymous class name is input. When a class having class code T04 to which reference should be made as a synonymous class is selected in class tree display portion 341, source class is automatically displayed in a text box 346 for source class in the synonymous class setting portion 342.

When the user selects a button 348, a class having class code Z03 is set as a synonymous class. Since it is often the case that the BSU which uniquely identifies a class does not have a meaning in its character string, the synonymous class BSU may be automatically input in the system. It should be noted that delete processing and association canceling processing of a class or a content table view are automatically executed by buttons 347 and 349.

As described above, according to this embodiment, in cases where a synonymous class does not have an instance, when indication information required to set a synonymous class is input by the input portion 12, identification information which distinguishes between a synonymous class and a regular class can be associated with a class indicated by the indication information.

For example, when a regular class is selected as source class, a recommended name in each language of the regular class can be displayed in the GUI as a default name of a synonymous class.

THIRTEENTH EMBODIMENT

This embodiment relates to another embodiment of the concrete synonymous setting technique.

Figure 35:
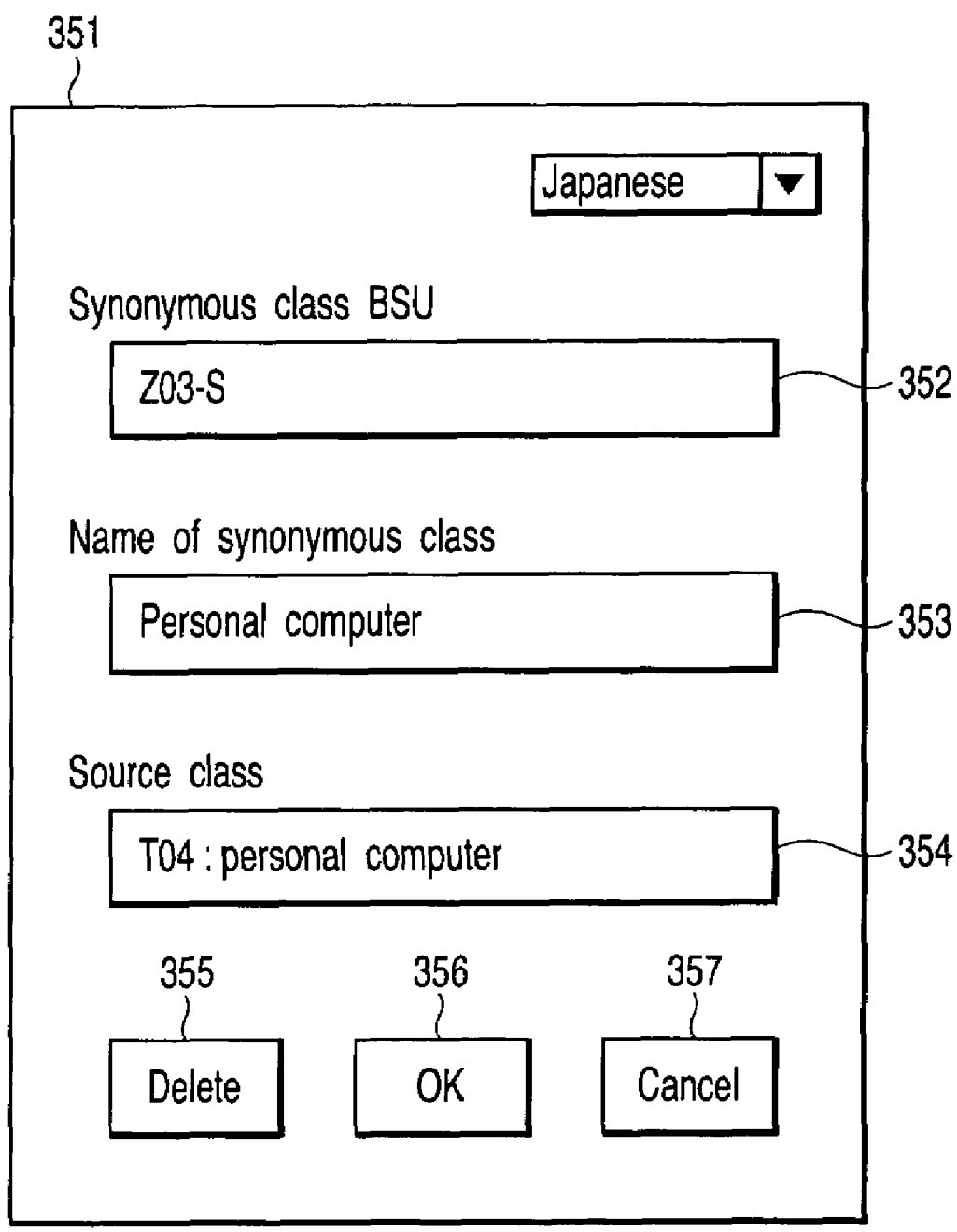
FIG. 35 is a view showing an example of a synonymous setting portion according to a thirteenth embodiment of the present invention.

FIG. 35 is a view showing an example of a synonymous setting portion 351 according to this embodiment. Any other displayed portion is common to FIG. 34, thereby eliminating such a portion. That is, in this embodiment, like FIG. 34, a class tree display portion 341 and a synonymous setting portion 351 are displayed. FIG. 35 shows a state in which automatic display is performed by selecting a synonymous class creation button 343. As shown in FIG. 35, a synonymous class name "Personal computer" may be displayed in a text box 353 for a synonymous class name in advance in order to facilitate input of a synonymous class name. Text boxes 352 to 354 and buttons 355 to 357 correspond to the text boxes 344 to 346 and the buttons 347 to 349 in FIG. 34.

Furthermore, when source class is a synonymous class, a name of this source class may be displayed in the text box 353 for a synonymous class name in advance in order to facilitate input of a synonymous class name.

As described above, according to this embodiment, when a regular class to which reference is made by a synonymous class is specified by the input portion 12, properties of the specified regular class can be displayed as properties of the synonymous class.

FOURTEENTH EMBODIMENT

This embodiment relates to another embodiment of display of a synonymous class.

Figure 36:
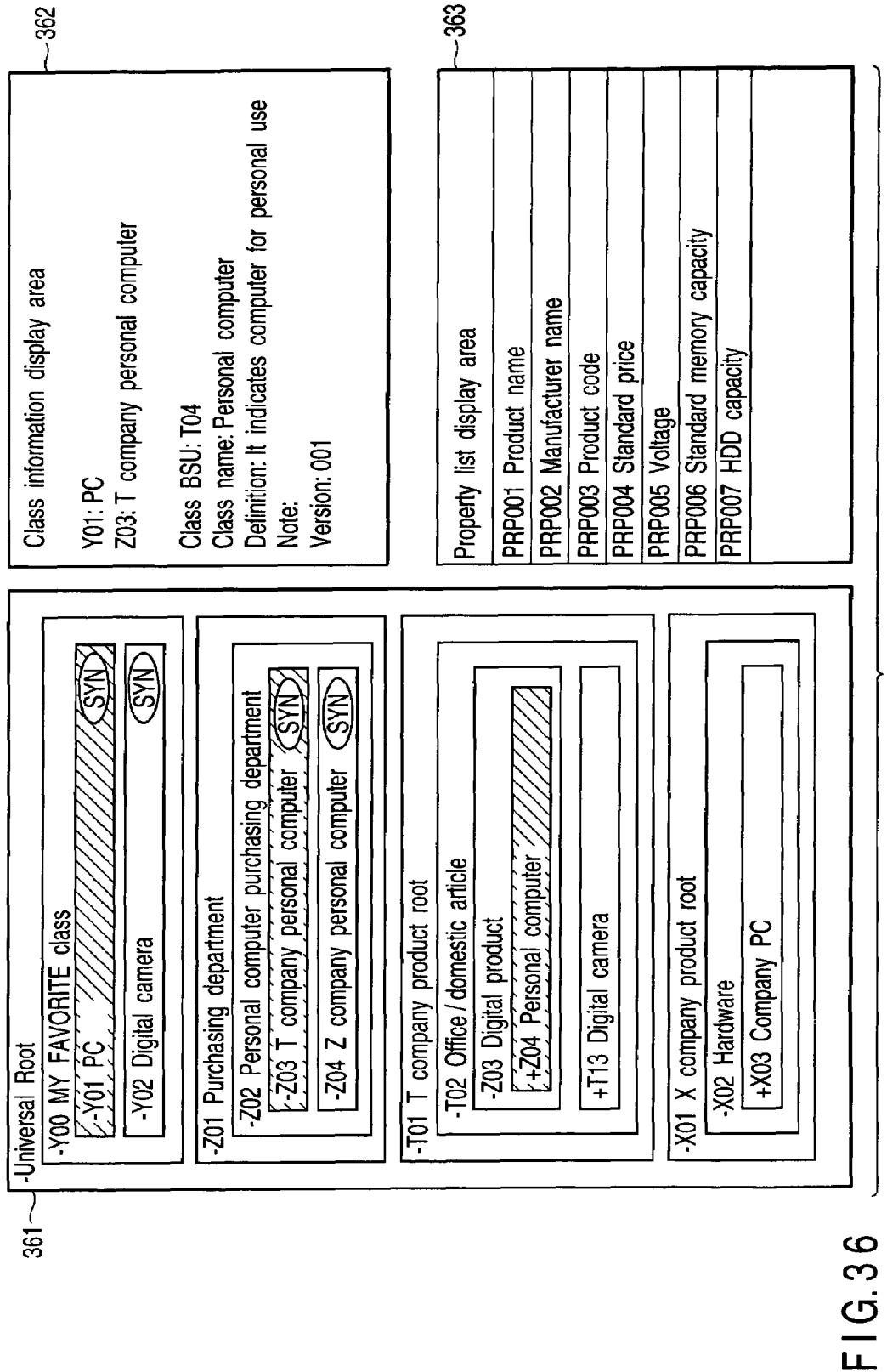
FIG. 36 is a view showing an example of a display screen according to a fourteenth embodiment of the present invention.

FIG. 36 is a view showing an example of a display screen according to this embodiment.

It is determined that synonymous class "Y01: PC" having a synonymous class Z03 as source class is defined. When a synonymous class having class code Y01 is selected in a class tree display portion 361, information of "Z03: T company personal computer" which is source class of the selected class is displayed in a class information display area 362 and a property list display area 363. However, the class having class code Z03 is a synonymous class, class information and a property list of "T04: Personal computer" which is source class of the class having class code Z03 are displayed.

As described above, according to this embodiment, the class edit processing portion 16 can acquire a regular class as source class of a synonymous class by executing processing of retrieving a class to which reference is made by the synonymous class once or a plurality of times, and perform processing of displaying the regular class to which reference is made by the synonymous class in distinction from any other class.

FIFTEENTH EMBODIMENT

This embodiment relates to an embodiment utilizing a virtual class called a MY FAVORITES class.

Figures 37, 38:
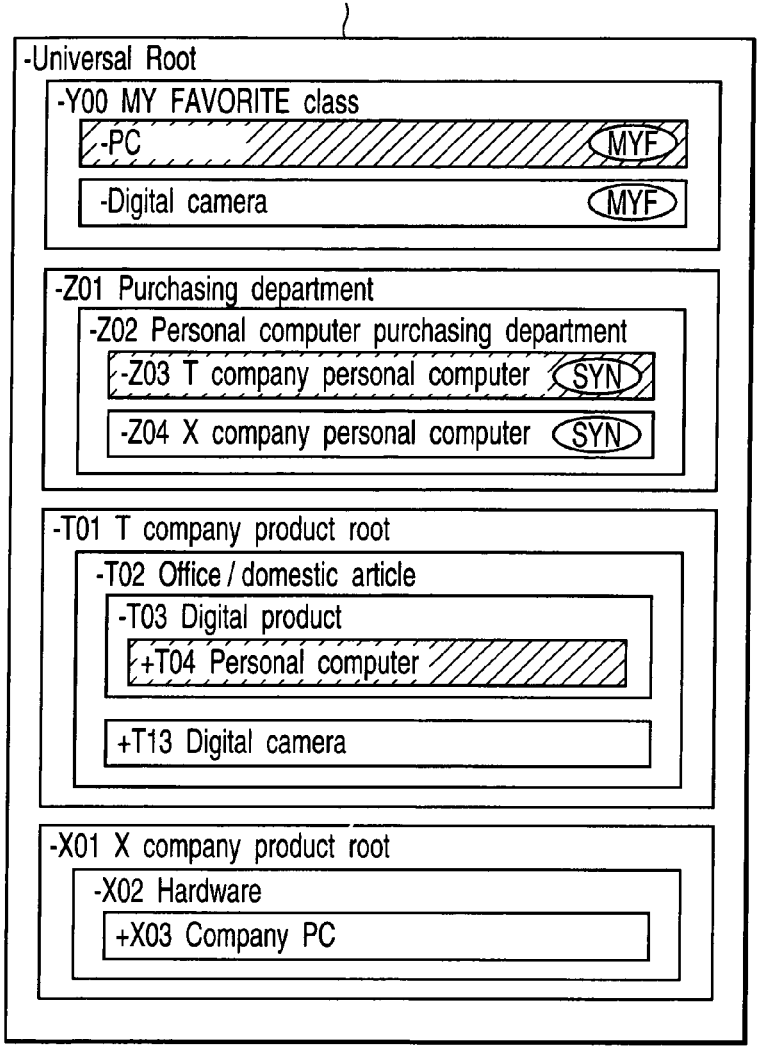
FIG. 37 is a view showing an example of screen display according to a fifteenth embodiment of the present invention.
FIG. 38 is a view showing an example of a MY FAVORITES setting file according to the fifteenth embodiment.

FIG. 37 is a view showing an example of display of a screen according to the present invention. In a class tree display portion 371 are displayed classes personally set by the user, i.e., "PC" having source class "Z04: T company personal computer" and "digital camera" having source class "T13: digital camera" like sub-classes of a virtual class which is a MY FAVORITES class in a class tree. Since there is no point in storing the MY FAVORITES class as dictionary information, this class does not need a class identifier (a class BSU) which is necessary for classes based on the ISO 13584 standards. Further, this class does not have to constitute a hierarchy (it may constitute a hierarchy). The setting of the MY FAVORITES class may be saved in the client or the server.

FIG. 38 is a view showing an example of a MY FAVORITES setting file. FIG. 38 shows an example in which a class hierarchy is not given to a MY FAVORITES class in particular. "JA" following a class identifier is language specification (Japanese in this example), and a MY FAVORITES name can be given in each language with respect to a class having a name in each language.

Furthermore, the class edit processing portion 16 converts a MY FAVORITES class into a synonymous class in response to a request from the user. At this time, since the MY FAVORITES class does not need a class BSU, the class BSU which is necessary for the synonymous class may be automatically added in the system or the user may be urged to set the class BSU.

That is, in this embodiment, the class edit processing portion 16 displays a view showing a MY FAVORITES class which is used to generate a synonymous class in accordance with the user or a group, displays a MY FAVORITES class as one of the classes in the hierarchical database, and stores a inheritance relationship between the MY FAVORITES class and any other class.

As described above, this embodiment generates a classification in accordance with each user based on existing classes and customizes a view (a presentation). It can be said that the class customized for each user (which will be referred to as a MY FAVORITES class hereinafter) is a classification for the user himself/herself. Therefore, this MY FAVORITES class is different from a reference target standard class (a regular class and a synonymous class) in the classification and presentation method. In general, information concerning the MY FAVORITES class does not have to be shared with other users. Therefore, the MY FAVORITES class does not need to have a standard code for a class or a property which is shared in a given community. However, an object which serves as a sign of a class is arranged on class tree displayed in the GUI which displays a classification system at the user's convenience. Moreover, properties or search values which are usually used for search are set in the MY FAVORITES class in advance. As a result, an intelligible and simple classification can be provided to the user.

Of course, the MY FAVORITES class, i.e., a personal class can be changed to a synonymous class by utilizing information of a regular class to which reference is made by this MY FAVORITES class. Alternatively, when the MY FAVORITES class makes reference to a synonymous class, the MY FAVORITES class can be changed to a synonymous class by utilizing information of a regular class to which the MY FAVORITES class makes reference. Alternatively, if a property or a search value which is usually used for search exists in common with users who belong to a given community or organization, such a property or a search value can of course be set in a synonymous class as a standard view.

For example, the following usage can be considered.

An icon, a button, a switch, a label and others are prepared on a screen as GUI elements for each user or group, and a MY FAVORITES object is individually generated and displayed for each user. Then, information concerning this MY FAVORITES class can be stored and reused. Additionally, this stored data is inserted into and displayed on the classification tree as if it is virtually a sorting class. When the user again uses the system, the MY FAVORITES class is automatically or semi-automatically read and displayed. Further, information concerning the MY FAVORITES class is output to a file and converted into a synonymous class in response to a command from the user. Then, insufficient information is embedded in advance, and a GUI on which the user overwrites and inputs this information is prepared.

The present invention is not restricted to the foregoing embodiments. Although description has been given for any example of dictionary information comprising the classification system complying with a data structure based on the PLIB standards, the data structure may be partially or completely based on the PLIB standards.

The present invention is not restricted to the foregoing embodiment as it is, and constituent elements may be modified and embodied at an embodying stage without departing from the scope of the invention. Furthermore, various inventions can be formed by appropriate combinations of a plurality of constituent elements disclosed in the foregoing embodiments. For example, some constituent elements may be deleted from all constituent elements disclosed in the embodiments. Moreover, constituent elements in different embodiments may be appropriately combined with each other.

As described above, the present invention is effective for the technical field of a hierarchical database management system, hierarchical database management method and hierarchical database management program which manage a so-called hierarchical database.

Furthermore, according to the present invention, management between classes of the hierarchical database can be facilitated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A system comprising:
a processor for accessing a hierarchical database; and the hierarchical database, in which a sub-class inherits to a property of a super class, having a class code for each class to identify the class, the hierarchical database comprising:
a first classification system having a regular class; and
a second classification system having the regular class and a synonymous class referring to and using the regular class of the first classification system, wherein
the synonymous class has an identification information to identify it is the synonymous class, a class code of the synonymous class, and a class code of the regular class of the first classification system to which the synonymous class refers.

2. The system according to claim 1, further comprising a display unit which displays the synonymous class which is distinguishable from the regular class based on the identification information.

3. The system according to claim 1, wherein an incidental information to describe the synonymous class as an independent entity to the regular class is associated with the synonymous class, and the system further comprises
a generating unit which generates the synonymous class by reading the identification information described in an input data.

4. The system according to claim 2, wherein the display unit displays the class code of the regular class as a reference target code of the synonymous class, or displays the class code of the synonymous class as the synonymous classification code of the regular class.

5. The system according to claim 1, wherein
the hierarchical database has an import structure which imports the class and the property to the first classification system and the second classification system, and has a simple inheritance structure in which a sub-class comprises an unique super class,
the synonymous class is described by the import structure as a class which imports the regular class of the first classification system to which the synonymous class refers, and incidental information associated with the synonymous class including information that the class is the synonymous class, and the system further comprises
a processing unit which processes the import structure as a multiple inheritance relation that the sub-class has two or more super classes.

6. The system according to claim 1, wherein
the hierarchical database has a simple inheritance structure that a sub-class has an unique super class,
the incidental information of the synonymous class includes the regular class to which the synonymous class refers and the information that the class is the synonymous class, and the system further comprises
a processing unit which processes the synonymous class as a multiple inheritance relation that the sub-class has two or more superclasses.

7. The system according to claim 1, wherein
the synonymous class has no instance,
the synonymous class is described by the special entity newly defined as a specialization of the entity which imports the class and the property of a classification system different from the first classification system, and the system further comprises a detector which detects that the synonymous class is a synonymous class based on that the synonymous class is described by the special entity.

8. The system according to claim 1, wherein
the synonymous class has no instance, and the regular class and the synonymous class are described by a first data according to the first classification system, a second data according to the second classification system, and a third data to which the synonymous reference information of the first classification system and the second classification system are described, and the system further comprises
a detector which detects the synonymous class based on the synonymous reference information of the third data.

9. The system according to claim 2, wherein
the synonymous class has no instance, and the system further comprises:
a unit which relates the identification information to a class that an instruction information directs when the instruction information to set the class to the synonymous class is input by an input unit.

10. The system according to claim 9, wherein the display unit displays the class information of the regular class specified with the input unit to which the synonymous class refers as a first candidate of the class information of the synonymous class.

11. The system according to claim 1, further comprising:
a selector which selects the synonymous class displayed on the display unit; and
a unit which detects selection of the synonymous class, and reads and displays the regular class to which the synonymous class refers.

12. The system according to claim 11, further comprising a unit which acquires the regular class as a source class of the synonymous class by executing a processing of searching a reference target class at once or repeatedly when a class to which the synonymous class refers is the synonymous class, and executes a processing of the regular class to which the synonymous class refers.

13. The system according to claim 1, further comprising a unit which executes a processing of the regular class to which the synonymous class refers when detecting an object of an operation with an input apparatus or a data processing is the synonymous class based on the identification information.

14. The system according to any one of claim 13, further comprising a unit which acquires the regular class as a source class of the synonymous class by executing a processing of searching a reference target class at once or repeatedly when a class to which the synonymous class refers is the synonymous class, and executes a processing of the regular class to which the synonymous class refers.

15. The system according to claim 1, wherein
the regular class has a first property, and the synonymous class has a second property, and further comprises:
a first setting unit which sets a first inheritance property inherited to first sub-class from a first super class in the first classification system including the regular class, the first setting unit further setting the first classification system to indicate that the second property is not inherited to the first sub-class; and
a second setting unit which sets a second inheritance property inherited to second sub-class from a second super class in the second classification system including the synonymous class, the second setting unit further setting the second classification system to indicate that the first property is not inherited to the second sub-class.

16. The system according to claim 1, further comprising:
a unit which displays a figures showing a first class to generate the synonymous class in a user or in each group;
a unit which displays the first class as one of the classes in the hierarchical database; and
a unit which stores an inheritance relation between the first class and other classes.

17. The system according to claim 1, wherein
a unit which sets a processing condition of the synonymous class or the regular class;
a unit which relates the set processing condition to the synonymous class or the regular class; and
a unit which processes the synonymous class or the regular class according to the processing condition.

18. A system comprising:
a processor for accessing a hierarchical database;
the hierarchical database having a class code for each class to identify the class, the hierarchical database comprising:
a first classification system having a regular class; and
a second classification system having the regular class and a synonymous class referring to and using the regular class of the first classification system, wherein
the synonymous class has an identification information to identify it is the synonymous class, a class code of the synonymous class, and a class code of the regular class of the first classification system to which the synonymous class refers.

* * * * *

UNITED STATES PATENT AND TRADEMARK OFFICE
CERTIFICATE OF CORRECTION

PATENT NO. : 7,333,986 B2 Page 1 of 1
APPLICATION NO. : 11/086229
DATED : February 19, 2008
INVENTOR(S) : Minamino et al.

It is certified that error appears in the above-identified patent and that said Letters Patent is hereby corrected as shown below:

Title page, item (57), in the Abstract, line 2, change "an super" to --a super--.

Claim 5, column 26, line 39, change "an unique" to --a unique--.

Claim 6, column 26, line 52, change "an unique" to --a unique--.

Claim 6, column 26, line 60, change "superclasses." to --super classes.--.

Claim 14, column 27, line 46, change "to any one of claim" to --to claim--.

Claim 16, column 28, line 20, change "a figures" to --a figure--.

Signed and Sealed this

Tenth Day of June, 2008

JON W. DUDAS
*Director of the United States Patent and Trademark Office*